US012751367B2

(12) United States Patent
Zhang et al.

(10) Patent No.: US 12,751,367 B2
(45) Date of Patent: Oct. 6, 2026

(54) ELECTRIC RIDING MOWER WITH GRASS COLLECTING DUCT

(71) Applicant: Nanjing Chervon Industry Co., Ltd., Nanjing (CN)

(72) Inventors: Lijin Zhang, Nanjing (CN); Jie Chen, Nanjing (CN); Li Li, Nanjing (CN); Runze Liu, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 392 days.

(21) Appl. No.: 18/498,920

(22) Filed: Oct. 31, 2023

(65) Prior Publication Data

US 2024/0215490 A1 Jul. 4, 2024

(30) Foreign Application Priority Data

Dec. 30, 2022 (CN) ......................... 202211726334.8
Dec. 30, 2022 (CN) ......................... 202223594401.3
(Continued)

(51) Int. Cl.
*A01D 43/06* (2006.01)
*A01D 34/66* (2006.01)
(Continued)

(52) U.S. Cl.
CPC ........... *A01D 43/06* (2013.01); *A01D 34/667* (2013.01); *A01D 43/063* (2013.01);
(Continued)

(58) Field of Classification Search
CPC .... A01D 43/06; A01D 34/667; A01D 43/063; A01D 43/0638; A01D 69/02;
(Continued)

(56) References Cited

U.S. PATENT DOCUMENTS

| | | | | |
|---|---|---|---|---|
| 6,431,305 B1 * | 8/2002 | Ishimori | ................ | A01D 34/66 180/374 |
| 6,484,486 B2 * | 11/2002 | Nagai | ................ | A01D 43/0635 56/16.8 |

(Continued)

FOREIGN PATENT DOCUMENTS

| | | |
|---|---|---|
| CN | 209994819 U | 1/2020 |
| CN | 210226236 U | 4/2020 |

(Continued)

*Primary Examiner* — Arpad Fabian-Kovacs
(74) *Attorney, Agent, or Firm* — Greenberg Traurig, LLP

(57) ABSTRACT

A riding mower includes a mowing assembly including a mowing element and a deck accommodating at least part of the mowing element; a traveling assembly including at least left traveling wheels and right traveling wheels; a traveling electric motor for driving the traveling assembly; a grass collecting pipe connected to the deck to guide grass clippings; and a power supply device configured to supply power to the traveling electric motor. The projection of the grass collecting pipe on a first plane supporting the traveling assembly is at least partially located between the left traveling wheels and the right traveling wheels. The maximum total energy of the power supply device is greater than or equal to 0.5 kW·h and less than or equal to 6 kW·h.

20 Claims, 35 Drawing Sheets

(30) Foreign Application Priority Data

| | | | |
|---|---|---|---|
| Dec. 30, 2022 | (CN) | ......................... | 202223594503.5 |
| Dec. 30, 2022 | (CN) | ......................... | 202223594505.4 |
| Dec. 30, 2022 | (CN) | ......................... | 202223594528.5 |
| Dec. 30, 2022 | (CN) | ......................... | 202223594606.1 |
| Dec. 30, 2022 | (CN) | ......................... | 202223611276.2 |
| Mar. 9, 2023 | (CN) | ......................... | 202320439347.0 |

(51) Int. Cl.

| | |
|---|---|
| ***A01D 43/063*** | (2006.01) |
| ***A01D 69/02*** | (2006.01) |
| *A01D 67/02* | (2006.01) |
| *A01D 75/00* | (2006.01) |
| *A01D 75/18* | (2006.01) |

(52) U.S. Cl.
CPC ......... *A01D 43/0638* (2013.01); *A01D 69/02* (2013.01); *A01D 67/02* (2013.01); *A01D 75/008* (2013.01); *A01D 75/182* (2013.01)

(58) Field of Classification Search
CPC .... A01D 67/02; A01D 75/008; A01D 75/182; A01D 34/664; A01D 34/71; A01D 67/00; A01D 69/10; A01D 43/0631
See application file for complete search history.

(56) References Cited

U.S. PATENT DOCUMENTS

| | | | | |
|---|---|---|---|---|
| 6,584,757 | B2 * | 7/2003 | Komorida .......... | A01D 43/0635 56/11.3 |
| 8,701,806 | B2 * | 4/2014 | Ishii ..................... | B60K 7/0007 180/65.6 |
| 9,499,199 | B1 * | 11/2016 | Laymon ............... | B62D 11/003 |
| 2005/0284685 | A1 * | 12/2005 | Oshima .................. | B60K 17/04 180/305 |
| 2009/0078485 | A1 * | 3/2009 | Gutsch ...................... | E01H 5/04 37/246 |
| 2011/0247886 | A1 * | 10/2011 | Sasahara ................ | A01D 34/78 180/6.5 |
| 2017/0265384 | A1 * | 9/2017 | Tanabe ................... | A01D 34/64 |
| 2019/0380270 | A1 * | 12/2019 | Uemura ............... | A01D 43/063 |
| 2020/0113133 | A1 * | 4/2020 | Zeiler .................... | A01D 34/78 |
| 2020/0205343 | A1 | 7/2020 | Ito | |
| 2020/0208657 | A1 * | 7/2020 | Uemura .................. | F15B 13/08 |
| 2022/0190426 | A1 | 6/2022 | Zeiler | |
| 2023/0180657 | A1 * | 6/2023 | Zeiler .................... | A01D 69/02 56/13.6 |

FOREIGN PATENT DOCUMENTS

| | | | | | |
|---|---|---|---|---|---|
| CN | 111629584 | B | | 9/2020 | |
| CN | 214314691 | U | | 9/2021 | |
| CN | 115486256 | A | | 12/2022 | |
| DE | 102021114372 | B4 | * | 10/2025 | ........... B60K 7/0015 |
| EP | 2505051 | B1 | | 10/2012 | |
| EP | 3653041 | A2 | * | 5/2020 | ......... A01D 43/0631 |
| EP | 3673723 | A1 | * | 7/2020 | ............. A01D 34/71 |
| EP | 3827659 | A1 | | 6/2022 | |
| EP | 4108066 | A2 | | 12/2022 | |
| JP | 2006246781 | A | | 9/2006 | |
| JP | 2007074955 | A | * | 3/2007 | ............. A01D 34/63 |
| JP | 2007074957 | A | * | 3/2007 | ............. A01D 34/63 |
| WO | 2018031719 | A1 | | 2/2018 | |
| WO | WO-2022176107 | A1 | * | 8/2022 | ............... B60K 1/04 |
| WO | WO-2022267913 | A1 | * | 12/2022 | .............. B60L 58/18 |

* cited by examiner

ELECTRIC RIDING MOWER WITH GRASS COLLECTING DUCT

RELATED APPLICATION INFORMATION

This application claims the benefit under 35 U.S.C. § 119(a) of Chinese Patent Application No. 202223594606.1, filed on Dec. 30, 2022, Chinese Patent Application No. 202211726334.8, filed on Dec. 30, 2022, Chinese Patent Application No. 202223594528.5, filed on Dec. 30, 2022, Chinese Patent Application No. 202223594505.4, filed on Dec. 30, 2022, Chinese Patent Application No. 202223611276.2, filed on Dec. 30, 2022, Chinese Patent Application No. 202223594503.5, filed on Dec. 30, 2022, Chinese Patent Application No. 202223594401.3, filed on Dec. 30, 2022, and Chinese Patent Application No. 202320439347.0, filed on Mar. 9, 2023, which applications are incorporated herein by reference in their entireties.

TECHNICAL FIELD

The present application relates to a riding device and, in particular, to a riding mower.

BACKGROUND

As a garden tool, a riding mowing device in the related art is widely used in the field of trimming lawns and vegetation. A riding mower is more labor-saving and more efficient in mowing than a push mower. On the market, in the riding mower, an air guide duct is usually disposed on a side of the machine and grass clippings are collected in a side discharging manner.

SUMMARY

A riding mower includes a mowing assembly including a mowing element and a deck accommodating at least part of the mowing element; a traveling assembly including at least left traveling wheels and right traveling wheels; a traveling electric motor configured to drive the traveling assembly; a grass collecting pipe connected to the deck to guide grass clippings; and a power supply device configured to supply power to the traveling electric motor. The projection of the grass collecting pipe on a first plane supporting the traveling assembly is at least partially located between the left traveling wheels and the right traveling wheels. The maximum total energy of the power supply device is greater than or equal to 0.5 kW·h and less than or equal to 6 kW·h.

In some examples, the power supply device is at least partially located in front of front traveling wheels in the front and rear direction.

In some examples, the front traveling wheels are connected through a front axle; and in the front and rear direction, the distance L1 between the front side of the power supply device and the front axle is greater than or equal to 0 and less than or equal to 500 mm.

In some examples, the ratio of the width W1 of the power supply device in the left and right direction to the width W2 of the riding mower in the left and right direction is greater than or equal to 0.2 and less than or equal to 1.5.

In some examples, the power supply device includes at least one battery pack pluggably connected to the riding mower to supply power to at least the traveling electric motor.

In some examples, the at least one battery pack is adaptable to another electrical device, where the electrical device includes a lighting device or a handheld power tool.

In some examples, the riding mower further includes a frame and a back plate assembly, where the mowing assembly and the traveling assembly are mounted to the frame; the back plate assembly includes fixing brackets and a back plate mounted on the fixing brackets; and the fixing brackets are mounted to the frame.

In some examples, the grass collecting pipe includes a first end connected to the deck and a second end opposite to the first end, where the second end is rotatably connected to the back plate.

In some examples, a full grass detection device for detecting the state of the grass clippings in an accommodation device is further included, where the full grass detection device is mounted to the back plate and includes a non-contact switch.

In some examples, the mowing assembly further includes a first mowing motor for driving a first cutting element and a second mowing motor for driving a second cutting element, where the direction of rotation of the first mowing motor is opposite to the direction of rotation of the second mowing motor.

In some examples, the riding mower further includes a brake mechanism, where the brake mechanism includes a first brake assembly for braking a front left traveling wheel and a second brake assembly for braking a front right traveling wheel, the brake mechanism further includes a first connection assembly connecting the first brake assembly to the second brake assembly, and the first connection assembly includes a first connector located on the upper side or the lower side of the grass collecting pipe.

In some examples, the riding mower further includes a height adjustment member, where the height adjustment member includes a first height adjustment assembly, a second height adjustment assembly, and a second connection assembly for connecting the first height adjustment assembly to the second height adjustment assembly, where the first height adjustment assembly and the second height adjustment assembly are connected to the deck, and at least part of the second connection assembly is located above the grass collecting pipe.

In some examples, the riding mower further includes a seat supported by a first support member and a second support member, where a connector is disposed between the first support member and the second support member, and at least part of the connector is located above the grass collecting pipe.

In some examples, the power supply device includes at least a first battery pack and a second battery pack, where the maximum energy of the first battery pack or the second battery pack is greater than or equal to 0.1 kW·h and less than or equal to 4 kW·h.

In some examples, the projection of the traveling electric motor on the first plane supporting the traveling assembly at least partially overlaps the projection of the grass collecting pipe on the first plane.

A riding mower includes a mowing assembly including a mowing element and a deck accommodating at least part of the mowing element; a traveling assembly configured to drive the riding mower to travel on the ground; a traveling electric motor configured to drive the traveling assembly; a power supply device configured to supply power to the traveling electric motor; and a grass collecting pipe connected to the deck to guide grass clippings. The projection of the traveling electric motor on a first plane supporting the traveling assembly at least partially overlaps the projection of the grass collecting pipe on the first plane.

In some examples, the traveling electric motor is located below the grass collecting pipe in the up and down direction.

In some examples, the traveling assembly includes a rear left traveling wheel and a rear right traveling wheel, where the rear left traveling wheel and the rear right traveling wheel are connected through a rear axle, and the traveling electric motor is located behind the rear axle in the front and rear direction.

A riding mower includes a mowing assembly including a mowing element and a deck accommodating at least part of the mowing element; a traveling assembly including at least traveling wheels and traveling electric motors driving the traveling wheels to rotate, where the traveling wheels include left traveling wheels and right traveling wheels; a grass collecting pipe connected to the deck to guide grass clippings; and a power supply device configured to supply power to the traveling electric motors. The projection of the grass collecting pipe on a first plane supporting the traveling assembly is at least partially located between the left traveling wheels and the right traveling wheels. One of the traveling electric motors is at least partially disposed inside one of the traveling wheels.

In some examples, the projection of the rotor of one of the traveling electric motors on the first plane is basically located within the projection of one of the traveling wheels on the first plane.

DETAILED DESCRIPTION

Figure 1:
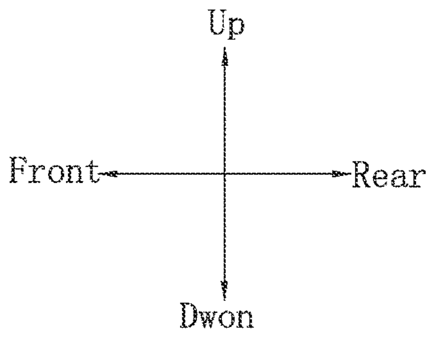
FIG. 1 is a perspective view of a riding mower according to an example of the present application.
Figure 1:
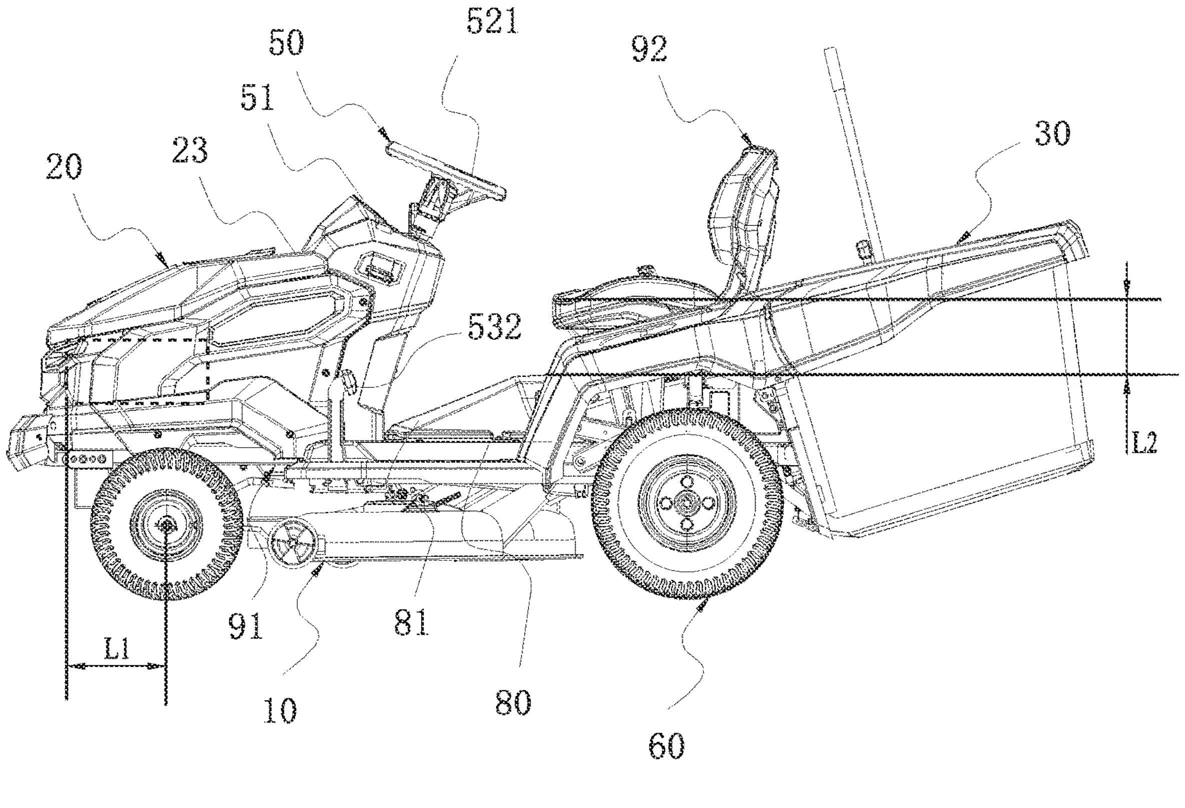

As shown in FIG. 1, a riding mower 100 disclosed in the present application is a lawn tractor. A user may sit or stand on the riding mower 100 to control the riding mower 100 to trim lawns and other vegetation. In this specification, directions such as the front, rear, left, right, up, and down are described as directions shown in FIG. 1. Specifically, when the user sits on the riding mower 100 on the ground, it is defined that a direction which the user faces is the front, a direction which the user faces away from is the rear, a direction on the left-hand side of the user is the left, a direction on the right-hand side of the user is the right, a direction facing the ground is the down, and a direction away from the ground is the up.

As shown in FIGS. 1 to 4, the riding mower 100 includes a mowing assembly 10, a housing assembly 20, a grass collecting mechanism 30, a power supply device 40, an operating assembly 50, a traveling assembly 60, a frame 91, and a seat 92. The frame 91 extends basically along the front and rear direction. The frame 91 and the housing assembly 20 form a body of the riding mower 100. The body is at least used for mounting or supporting the mowing assembly 10, the seat 92, and the power supply device 40. The power supply device 40 is used for supplying energy to the mowing assembly 10, the traveling assembly 60, and the like so that the riding mower 100 can be used as a power tool. The electric riding mower 100 is more environmentally friendly and more energy-efficient than a fuel-based riding mower.

Specifically, the housing assembly 20 includes at least a left cover 21, a right cover 22, and a front cover 23. The front cover 23 is disposed on the front part of the riding mower 100 and is the front face of the riding mower 100. The power supply device 40 is at least used for supplying electric power to the mowing assembly 10, the traveling assembly 60, and the like. The power supply device 40 includes at least one battery pack for storing electrical energy. In this example, the power supply device 40 is disposed on the front part of the riding mower 100 and is covered by the front cover 23. The power supply device 40 includes the battery pack and a battery holder housing for mounting the battery pack. One or multiple battery packs and battery holders may be provided. In some examples, the total energy of the power supply device 40 is greater than or equal to 0.5 kW·h and less than or equal to 6 kW·h. In some examples, the total energy of the power supply device 40 is greater than or equal to 1 kW·h and less than or equal to 5 kW·h. The total energy of the preceding power supply device may be understood as the sum of the energy of all battery packs. In some examples, the power supply device 40 includes at least a first battery pack and a second battery pack. The energy of the first battery pack or the second battery pack is greater than or equal to 0.1 kW·h and less than or equal to 4 kW·h. At least one battery pack pluggably connected to the riding mower to supply power to at least the traveling electric motor, The at least one battery pack is adaptable to another electrical device, and the electrical device includes a lighting device or a handheld power tool.

The traveling assembly 60 is used for supporting the frame 91 so that the riding mower 100 can travel on the ground. Specifically, the frame 91 includes longitudinal beams and cross beams. In some examples, the frame 91 includes a first longitudinal beam 911, a second longitudinal beam 912, a first cross beam 913, and a second cross beam 914. The first longitudinal beam 911 is disposed on the left side of the seat 92, and the second longitudinal beam 912 is disposed on the right side of the seat 92. The extension direction of the first longitudinal beam 911 is parallel to the extension direction of the second longitudinal beam 912. The first cross beam 913 is disposed on the front side of the seat 92. The first cross beam 913 is basically located at the front end of the riding mower 100, and the second cross beam 914 is basically located at the rear end of the riding mower 100. In this manner, the first cross beam 913 and the second cross beam 914 serve as bumpers to protect the front end and rear end of the riding mower 100 from being damaged. The traveling assembly 60 includes left traveling wheels and right traveling wheels. The left traveling wheels include a front left traveling wheel 611 and a rear left traveling wheel 612. The right traveling wheels include a front right traveling wheel 621 and a rear right traveling wheel 622. The front left traveling wheel 611 and the front right traveling wheel 621 are connected through a front axle 915. The rear left traveling wheel 612 and the rear right traveling wheel 622 are connected through a rear axle 916.

In some examples, as shown in FIG. 1, the power supply device 40 is at least partially located in front of front traveling wheels in the front and rear direction. The preceding front traveling wheels include the front left traveling wheel 611 and the front right traveling wheel 621. Specifically, in the front and rear direction, the distance L1 between the front side of the power supply device 40 and the front axle 915 is greater than or equal to 0 and less than or equal to 500 mm. In some examples, in the front and rear direction, the distance L1 between the front side of the power supply device 40 and the front axle 915 is greater than or equal to 0 and less than or equal to 300 mm. In some examples, in the front and rear direction, the distance L1 between the front side of the power supply device 40 and the front axle 915 is equal to 200 mm.

The mowing assembly 10 is used for outputting power to implement the function of the riding mower 100. The mowing assembly 10 serves as a power output member. In some examples, the mowing assembly 10 includes mowing elements 12, a deck 11 accommodating at least part of the mowing elements 12, and mowing motors 13 for driving the mowing elements 12 to rotate. The mowing elements 12 are used for cutting vegetation when rotating at high speed. For example, the mowing elements 12 are blades for cutting grass on the lawn. The deck 11 surrounds a mowing space 111 for accommodating at least part of the mowing elements 12. That is to say, the mowing elements 12 are at least partially accommodated in the deck 11, and the mowing motors 13 are used for driving the mowing elements 12 to rotate. The mowing assembly 10 is disposed below the frame 91. In some examples, two mowing elements 12 may be provided and two mowing motors 13 may be provided. In some examples, three mowing elements 12 may be provided and three mowing motors 13 may be provided. The mowing elements 12 are located in the mowing space 111 surrounded by the deck 11. The mowing space 121 is open downward so that the mowing elements 12 can perform cutting operations on the vegetation below the mowing space 111.

In some examples, the mowing assembly 10 is detachable from the riding mower 100. In this case, a work attachment interface of the riding mower 100 may be connected to another work attachment, such as a snow shoveling assembly. In this manner, the riding mower 100 is no longer just a riding mower and may also be a riding vehicle that can perform different tasks according to different connected work attachments. Different work attachment interfaces are used for matching different work attachments, and the same work attachment interface may match different work attachments.

The grass collecting mechanism 30 is used for collecting the grass clippings cut by the mowing assembly 10. As shown in FIGS. 4 to 7, the grass collecting mechanism 30 includes an accommodation device 31 for accommodating grass clippings and a grass collecting pipe 32 connected to the deck 11. The accommodation device 31 is detachable or movably mounted to a body 100*a*. The body 100*a* includes at least the mowing assembly 10, the traveling assembly 60, and the grass collecting pipe 32. The accommodation device 31 is used for collecting the grass clippings cut by the mowing assembly 10, and the grass collecting pipe 32 is used for guiding the grass clippings into the accommodation device 31. Specifically, the grass collecting mechanism 30 further includes a back plate assembly 33. The back plate assembly 33 is used for supporting the grass collecting pipe 32 and mounting the accommodation device 31.

Specifically, the back plate assembly 33 includes a back plate 332 disposed between the accommodation device 31 and the grass collecting pipe 32. The back plate 332 is fixed to the frame 91 through fixing brackets. Specifically, the fixing brackets include a first fixing bracket 341 and a second fixing bracket 342. The first fixing bracket 341 and the second fixing bracket 342 are fixedly mounted to the first longitudinal beam 911 and the second longitudinal beam 912 of the frame 91 through screw fastening, respectively. The left side and right side of the back plate 332 are fixedly mounted to the first fixing bracket 341 and the second fixing bracket 342. In some examples, the back plate 332 includes an upper back plate part 3321 and a lower back plate part 3322. The upper back plate part 3321 is made of plastic and vent holes are distributed in the upper back plate part 3321 so that the weight of the vehicle body can be effectively reduced and the grass collecting efficiency can be improved. The lower back plate part 3322 is made of metal so that the strength of the lower part of the back plate can be improved and the collision damage to the plastic back plate is avoided.

The grass collecting pipe 32 extends upward and backward from the transverse middle of the rear part of the deck 11 to form a grass outlet 321. The grass outlet 321 connects with the accommodation device 31 and is used for the grass cut by the mowing element 12 to be transferred from the mowing assembly 10 to the accommodation device 31 through the grass collecting pipe 32 so that the grass accumulates in the accommodation device 31. The projection of the grass collecting pipe 32 on a first plane 101 supporting the traveling assembly 60 is at least partially located between the left traveling wheels and the right traveling wheels. Specifically, the grass collecting pipe 32 extends backward between the rear left traveling wheel 612 and the rear right traveling wheel 622, passes above the rear axle 916 connecting the rear left traveling wheel 612 to the rear right traveling wheel 622, and finally, is mounted to the back plate 332.

In some examples, the area of the grass outlet 321 is greater than or equal to 0.03 $m^2$ and less than or equal to 0.04 $m^2$. Specifically, the area of the grass outlet 321 is 0.0325 $m^2$. In some examples, the wind speed at the grass outlet 321 is greater than or equal to 10 m/s and less than or equal to 20 m/s. The flow rate at the grass outlet 321 is greater than or equal to 0.325 $m^3$/s and less than or equal to 0.65 $m^3$/s. In some examples, the ratio of the maximum total capacity (Ah) of the power supply device to the flow rate ($m^3$/s) at the grass outlet 321 of the grass collecting pipe is greater than or equal to 10 and less than or equal to 450. In some examples, the ratio of the maximum total capacity of the power supply device to the flow rate at the grass outlet 321 of the grass collecting pipe is greater than or equal to 50 and less than or equal to 150. In some examples, the ratio of the maximum total capacity of the power supply device to the flow rate at the grass outlet 321 of the grass collecting pipe is greater than or equal to 60 and less than or equal to 120.

Figure 2:
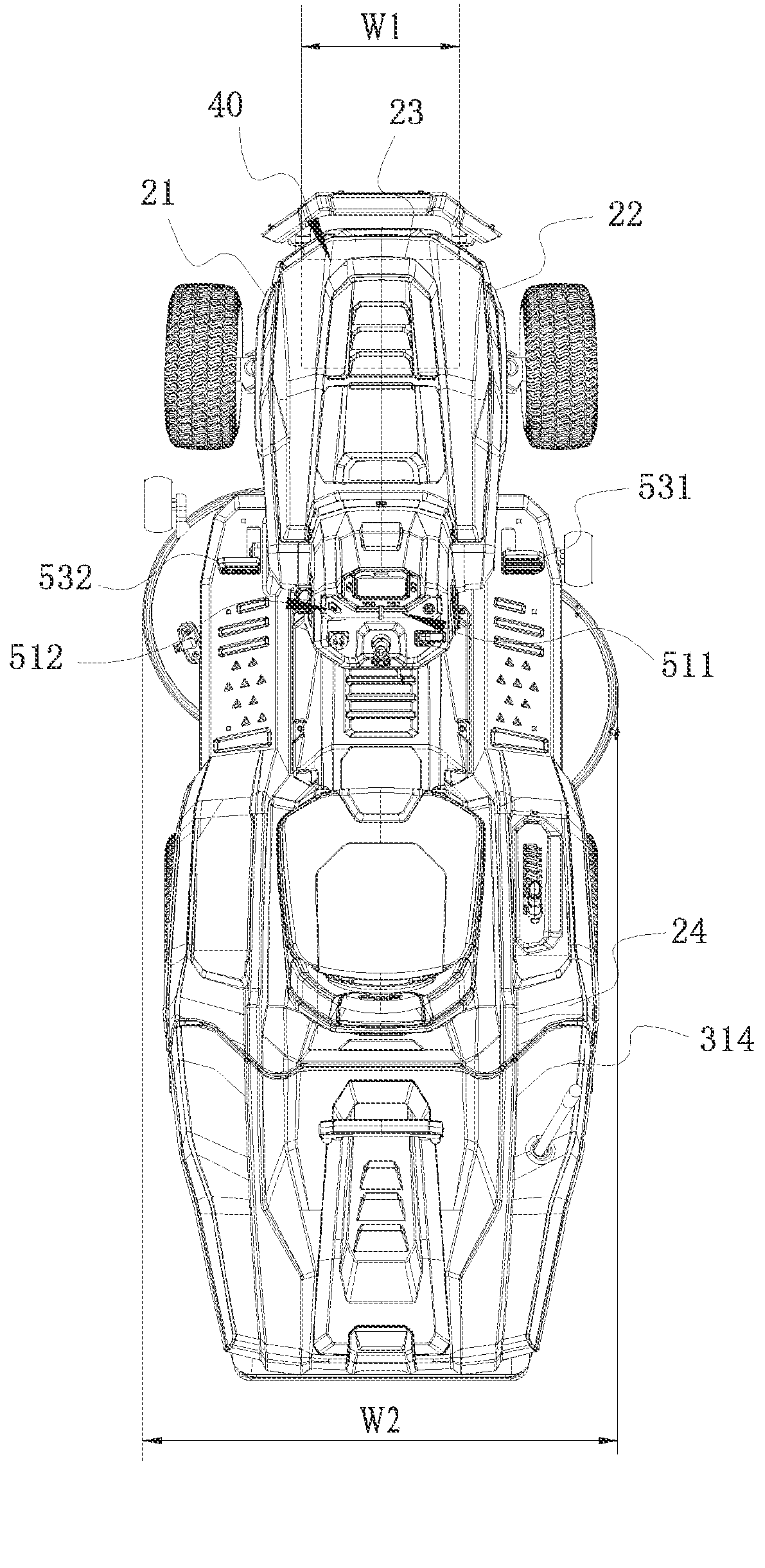
FIG. 2 is a perspective view of the riding mower in FIG. 1 from another perspective.
Figure 3:
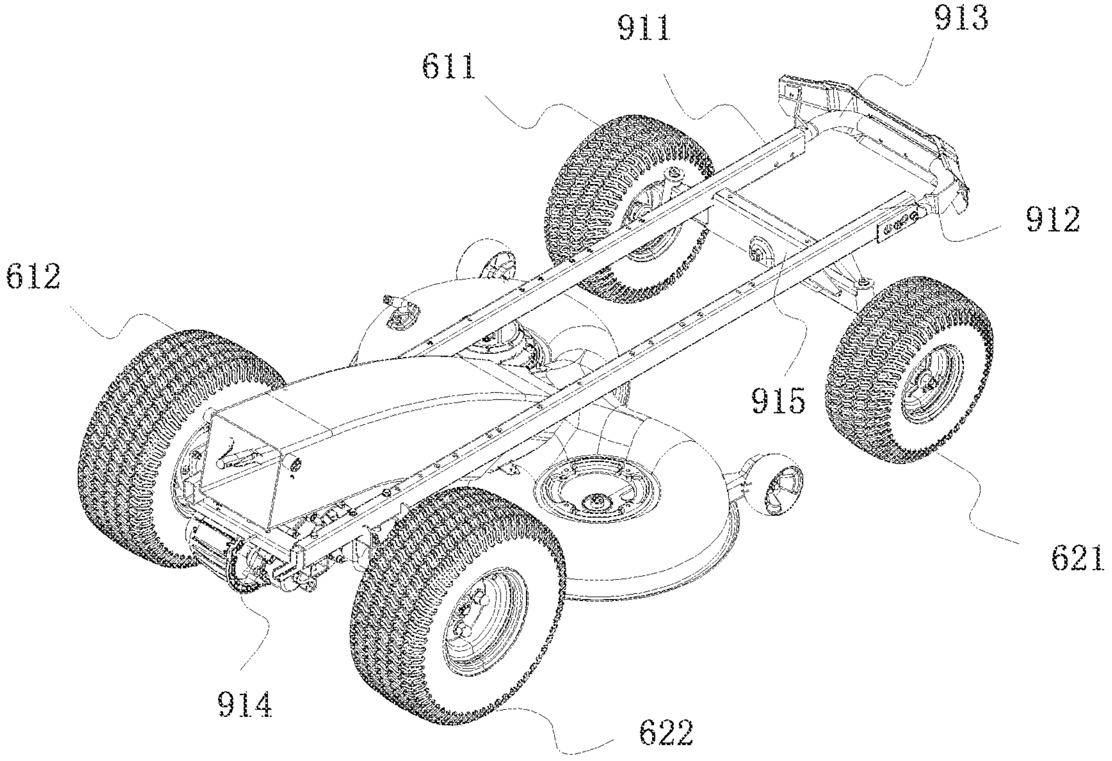
FIG. 3 is a perspective view of a mowing assembly, a grass collecting pipe, a traveling assembly, and a frame of a riding mower according to an example of the present application.

In some examples, as shown in FIG. 2, the ratio of the width W1 of the power supply device 40 in the left and right direction to the width W2 of the riding mower 100 in the left and right direction is greater than or equal to 0.2 and less than or equal to 1.5. In some examples, the ratio of the width W1 of the power supply device 40 in the left and right direction to the width W2 of the riding mower 100 in the left and right direction is greater than or equal to 0.2 and less than or equal to 0.8. In some examples, the ratio of the width W1 of the power supply device 40 in the left and right direction to the width W2 of the riding mower 100 in the left and right direction is greater than or equal to 0.3 and less than or equal to 0.5.

In some examples, the traveling assembly 60 further includes a traveling electric motor 63 for driving the traveling assembly 60 to travel and a transmission device 64. Since the grass collecting mechanism 30 of the riding mower 100 in the present application is disposed substantially in the middle, the traveling electric motor 63 and the transmission device 64 need to be reasonably arranged. In this example, the transmission device 64 is mounted to the rear axle 916, the traveling electric motor 63 drives the transmission device 64 to rotate, the transmission device 64 drives the rear axle 916 to rotate, and the rear axle 916 drives the rear left traveling wheel 612 and the rear right traveling wheel 622 to rotate, thereby driving the riding mower 100 to travel on the ground. In some examples, the traveling electric motor 63 is located below the grass collecting pipe 32 in the up and down direction. In some examples, the traveling electric motor 63 is disposed behind the rear axle 916 in the front and rear direction. In some examples, the projection of the traveling electric motor 63 on the first plane 101 supporting the traveling assembly 60 at least partially overlaps the projection of the grass collecting pipe 32 on the first plane 101. In some examples, the traveling electric motor 63 is not lower than the back plate assembly 33 in the up and down direction, thereby protecting the traveling electric motor 63 from being hit.

In some examples, the grass collecting pipe 32 includes a first pipe part 322 connected to the deck 11 and a second pipe part 323 connecting with the first pipe part 322. The front end of the second pipe part 323 connects with the rear end of the first pipe part 322. In some examples, the first pipe part 322 is detachably connected to the deck 11. In some examples, the first pipe part 322 is integrally formed with the deck 11.

The grass collecting pipe 32 includes a first end 324 connected to the deck 11 and a second end 325 opposite to the first end 324. The first end 324 of the grass collecting pipe 32 connects with the mowing space 111 formed by the deck 11, and the second end 325 is mounted to the back plate assembly 33. In some examples, the second end 325 of the grass collecting pipe 32 is mounted to the back plate 332 through mounts 331. The mount 331 has a first state in which the mount 331 prevents the grass collecting pipe 32 from being separated from the back plate assembly 33 and a second state in which the grass collecting pipe 32 is allowed to be separated from the back plate assembly 33. When the mount 331 is in the first state, the mount 331 is connected to the back plate assembly 33. When the mount 331 is in the second state, the mount 331 is connected to the back plate assembly 33. When the mount 331 is switched from the first state to the second state in which the grass collecting pipe 32 is allowed to be separated from the back plate assembly 33, the mount 331 is still connected to the back plate assembly 33. In other words, the mount 331 is always connected to the back plate assembly 33, thereby preventing the mount 331 from being lost.

Figure 7:
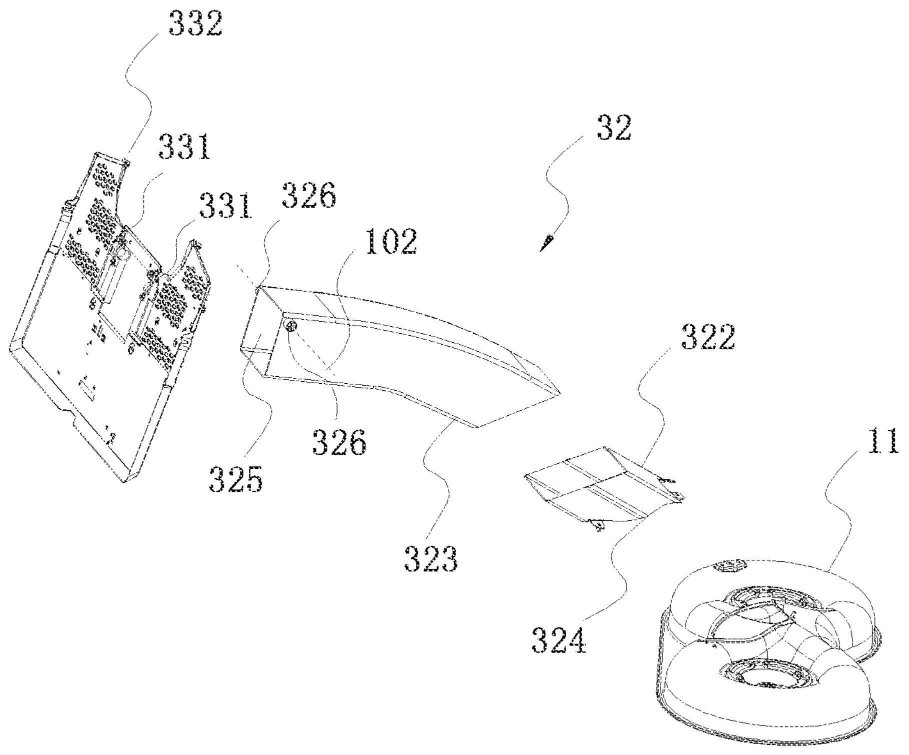
FIG. 7 is an exploded view of a deck, a grass collecting pipe, and a back plate according to an example of the present application.
Figure 8:
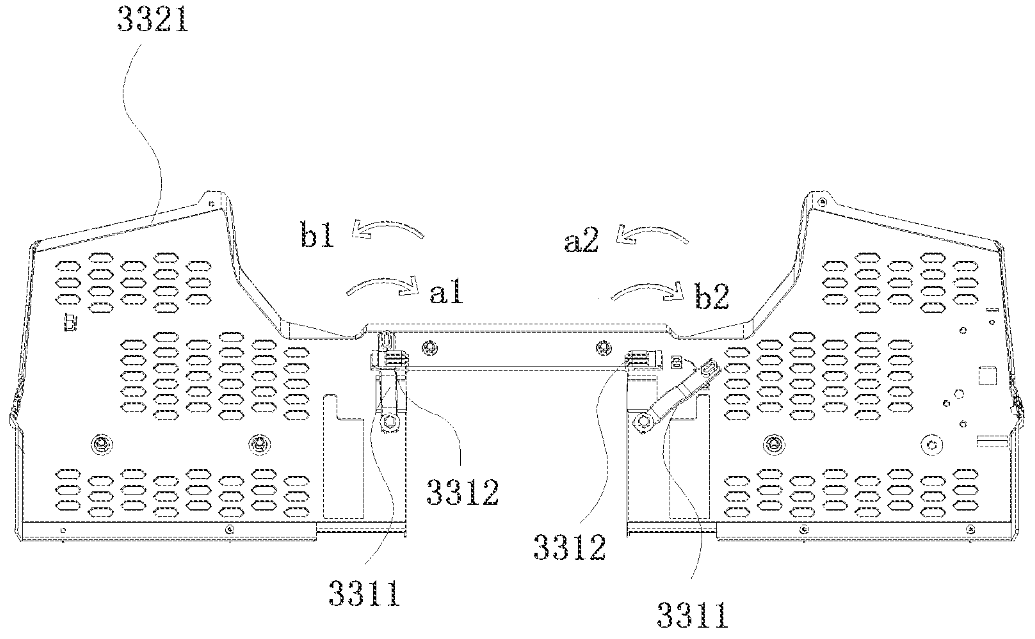
FIG. 8 is a perspective view of the back plate and a connector in FIG. 7.

Specifically, as shown in FIGS. 7 and 8, the mount 331 includes a locking rod 3311 and a limiting portion 3312. The locking rod 3311 is rotatably mounted on the upper back plate part 3321. The limiting portion 3312 is fixedly formed on or connected to the upper back plate part 3321. The second end 325 of the grass collecting pipe 32 is formed with or connected to a connecting portion 326. Specifically, when the user needs to mount the grass collecting pipe 32 to the back plate assembly 33, the user needs to operate the locking rods 3311 along the directions of the arrow a1 and the arrow a2 in FIG. 8 to move the locking rods 3311 to the limiting portions 3312 so that the mounts 331 are in the first state, thereby relatively locking the grass collecting pipe 32 on the back plate assembly 33. When the user needs to disassemble the grass collecting pipe 32 from the back plate assembly 33, the user needs to operate the locking rods 3311 along the directions of the arrow b1 and the arrow b2 in FIG. 8 to move the locking rods 3311 away from the limiting portions 3312 so that the mounts 331 are in the second state, thereby separating the grass collecting pipe 32 from the back plate assembly 33. The preceding relative locking means that in this state, the second end 325 of the grass collecting pipe 32 is adaptively rotatable about a first axis 102. The connecting portion 326 extends substantially along the preceding first axis 102. In this manner, during the grass collecting process of the riding mower 100, when the user adjusts the height of the mowing assembly 10, the second end 325 of the grass collecting pipe 32 is adaptively rotatable about the first axis 102 to match the position change of the first end 324 of the grass collecting pipe 32. In addition, the mounts 331 are detachably fixedly mounted on the back plate assembly 33 and are not easy to loosen or be lost.

Figure 9:
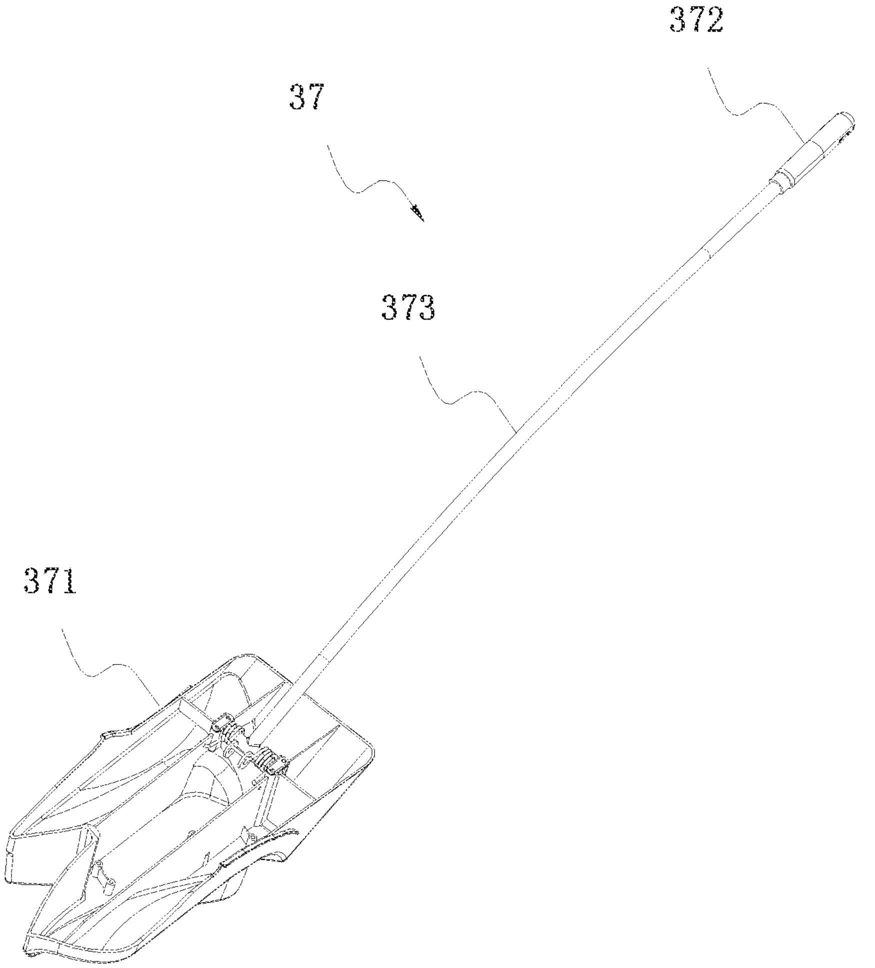
FIG. 9 is a perspective view illustrating the structure of a plug assembly according to an example of the present application.

As shown in FIG. 9, the riding mower 100 further includes a plug assembly 37. After the plug assembly 37 is mounted to the grass collecting pipe 32, the riding mower 100 enters a grass shredding mode. Specifically, the plug assembly 37 includes a plug 371, a handle 372, and an extension rod 373 connecting the plug 371 to the handle 372. The plug 371 can be disposed near the first end 324 of the grass collecting pipe 32 to isolate the deck 11 from the grass collecting pipe 32. The length of the extension rod 373 is basically the same as the length of the grass collecting pipe 32, and the extension direction of the extension rod 373 is similar to the extension direction of the grass collecting pipe 32. The handle 372 is used for the user to hold. When the user mounts the plug assembly 37, the plug assembly 37 is inserted into the grass outlet 321 and pushed to the second end 325 of the grass collecting pipe 32. After the plug assembly 37 is mounted, the handle 372 is substantially located at the grass outlet 321. In some examples, the riding mower 100 further includes a plug detection device for detecting whether the plug 371 is located at an installation position, thereby improving the safety performance of the riding mower 100. Those skilled in the art can reasonably design the sensors and the arrangement positions of the sensors of the plug detection device according to actual application conditions. For this, no limitation is made in the present application.

Figure 5:
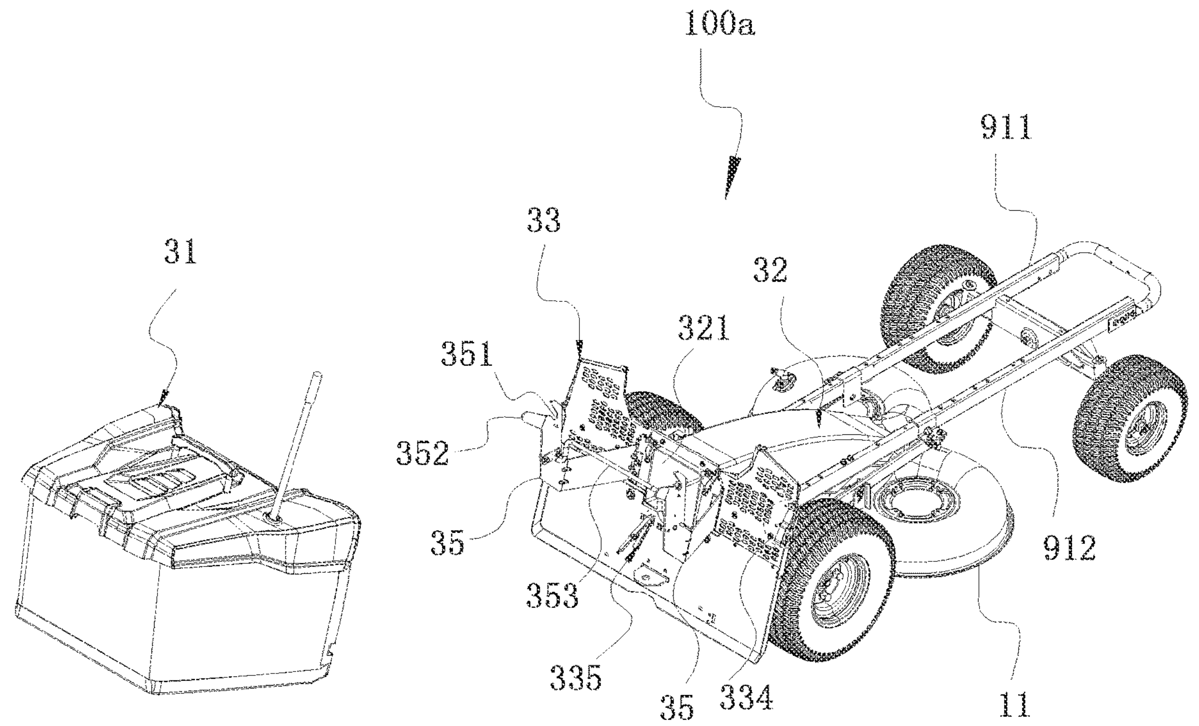
FIG. 5 is a perspective view of a body and an accommodation device of a riding mower according to an example of the present application.
Figure 10:
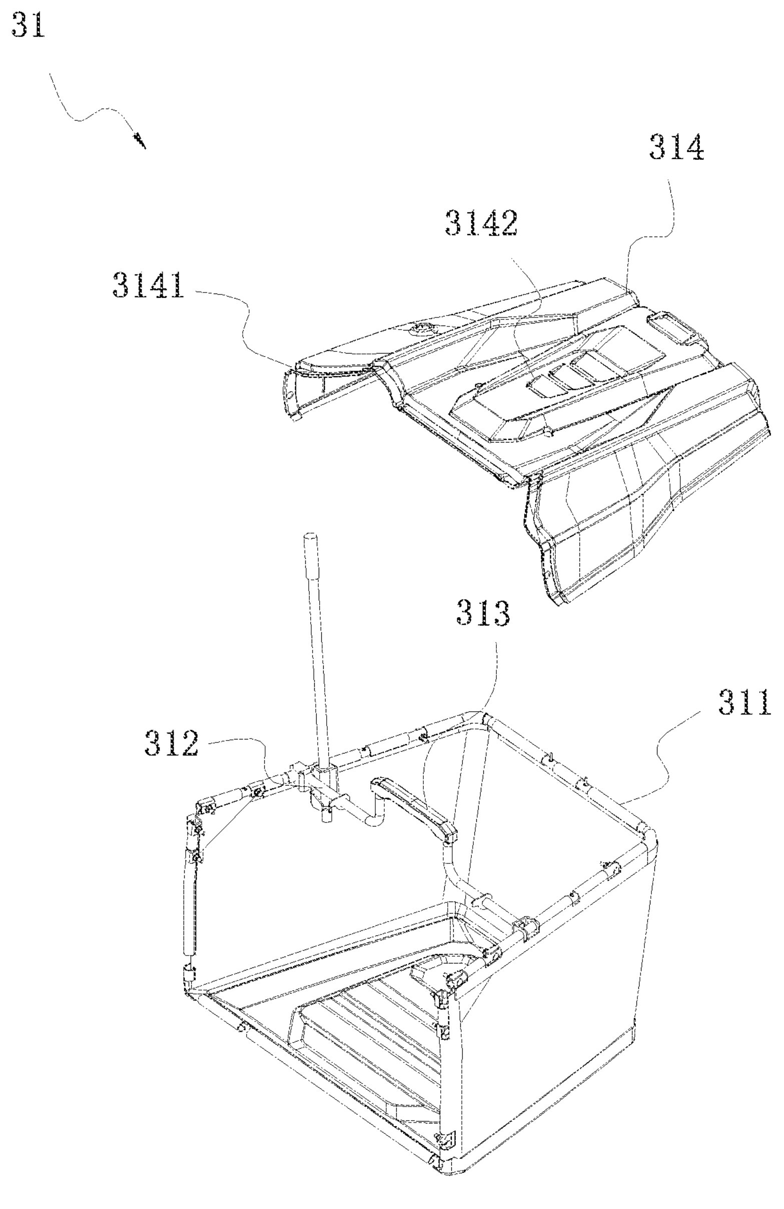
FIG. 10 is an exploded view of a detached upper cover of an accommodation device according to an example of the present application.
Figure 11:
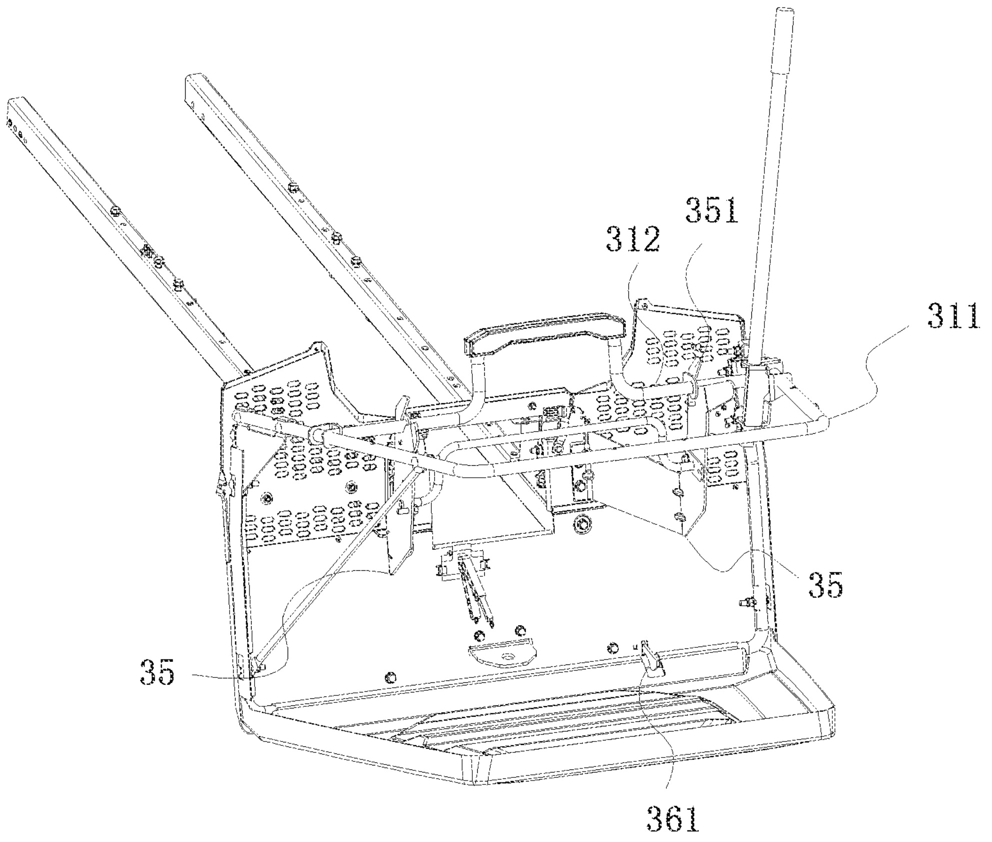
FIG. 11 is a perspective view illustrating the structure of a back plate assembly and a support bracket of an accommodation device according to an example of the present application.

The accommodation device 31 is used for collecting the grass clippings cut by the mowing assembly 10. As shown in FIGS. 5, 10, and 11, the accommodation device 31 includes a support bracket 311 and an upper cover 314 covering the support bracket 311. In some examples, a decorative cover 3142 is disposed on the upper cover 314 so that the decorative cover 3142 is used for the user to open to view the state of the grass clippings in the accommodation device 31 while beautifying the appearance. In some examples, a bent portion 3141 is formed on or connected to a side of the upper cover 314. The bent portion 3141 is used for connecting a middle cover 24. In this manner, the accommodation device 31 is easy to install and has relatively strong waterproof and grass-proof performance.

The accommodation device 31 further includes mounts 312 connected to the support bracket 311, where the mounts 312 are hung on the back plate assembly 33. Further, the mounts 312 are formed with or connected to a handle 313 for the user to carry. The handle 313 is disposed above the upper cover 314. In this example, the mounts 312 are made of metal. To improve the user's feel and the appearance, the handle 313 is further wrapped with a plastic part.

The grass collecting mechanism 30 further includes support members 35 for supporting the accommodation device 31 hung on the back plate assembly 33. Specifically, the support members 35 are connected to fixing brackets 34 and extend backward through the back plate 332 to form support portions 351 for supporting the accommodation device 31. The support portions 351 are used for supporting the mounts 312 of the accommodation device 31, thereby implementing the function of supporting the accommodation device 31. The support portion 351 is formed with or connected to a guide portion 352 for guiding the accommodation device 31 during installation so that it is convenient for the user to mount the accommodation device 31 to the back plate assembly 33 more quickly. In this example, two support members 35 are provided, and a balance rod 353 extending substantially along the left and right direction is further disposed between the two support members 35. The balance rod 353 is used for improving the strength of the support members 35, preventing the support members 35 from tilting, and improving the assembly accuracy.

Figure 6:
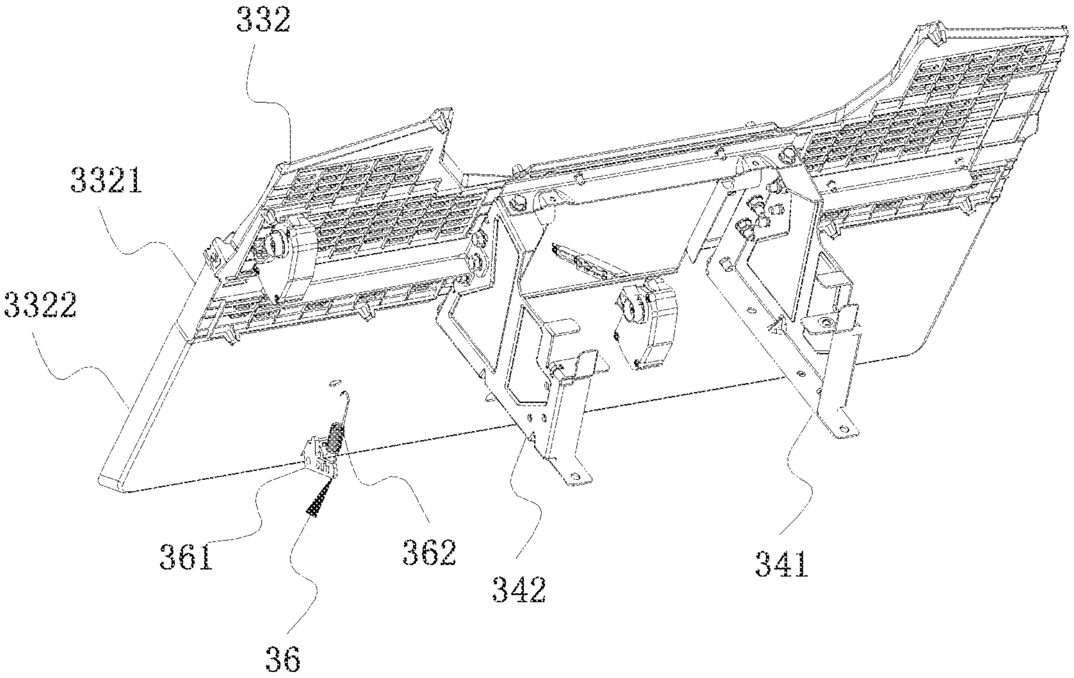
FIG. 6 is a perspective view illustrating the structure of a back plate assembly of a riding mower according to an example of the present application.

The accommodation device 31 is connected to the back plate assembly 33 in a hanging manner so that it is convenient for the user to mount or disassemble the accommodation device 31. To improve the stability of the accommodation device, in some examples, as shown in FIGS. 6 and 11, a locking device 36 is disposed between the back plate 332 and the lower front edge of the accommodation device 31 and is used for connecting and fixing the lower part of the accommodation device 31 to the back plate 36. The locking device 36 includes an engagement part 361 fixed on the back plate 36 and a pushing part 362 applying the engagement force and the retaining force to the engagement part 361. Specifically, the engagement part 361 is set in a hook shape and is hooked to the support bracket 311 of the accommodation device 31. The pushing part 362 is configured to be a spring.

Figure 12:
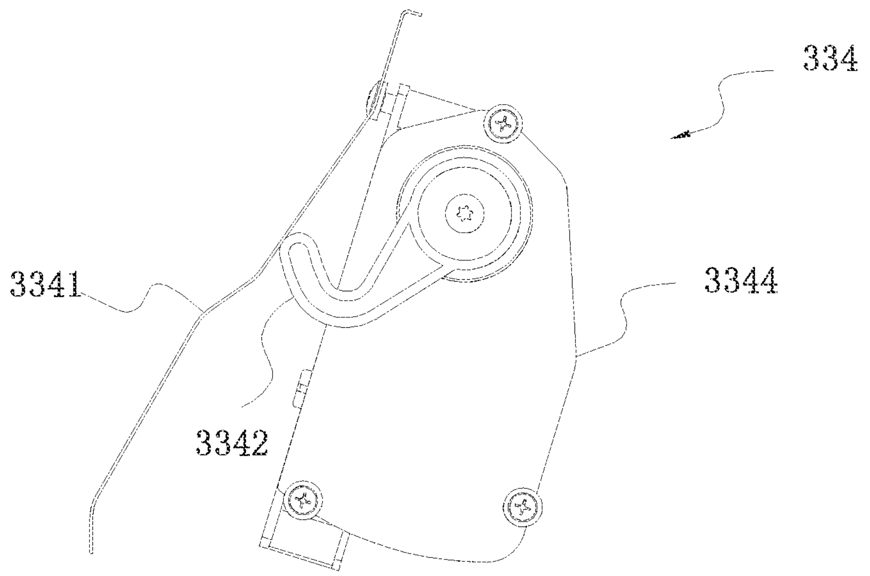
FIG. 12 is a perspective view illustrating the structure of a grass collecting detection device according to an example of the present application.
Figure 13:
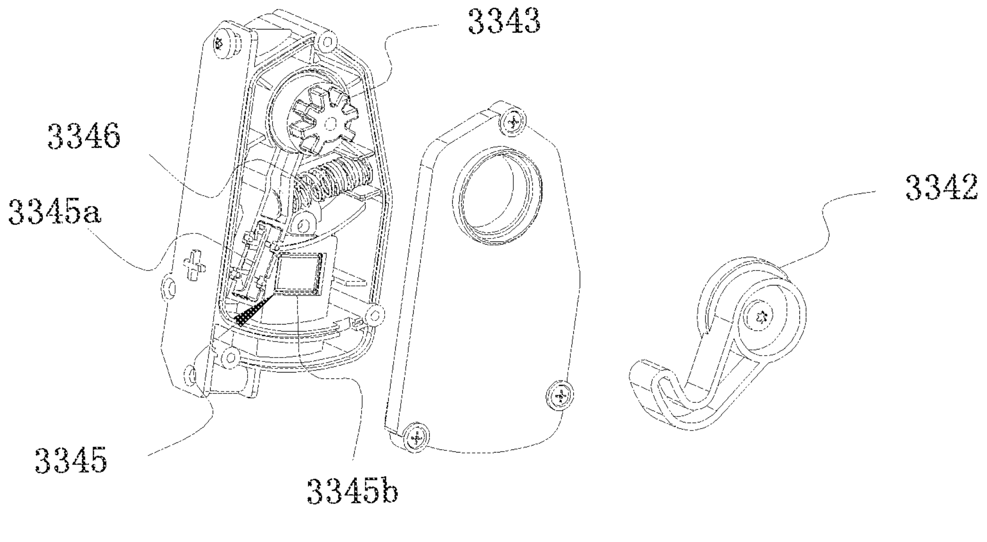
FIG. 13 is an exploded view of the grass collecting detection device in FIG. 12.
Figure 14A:
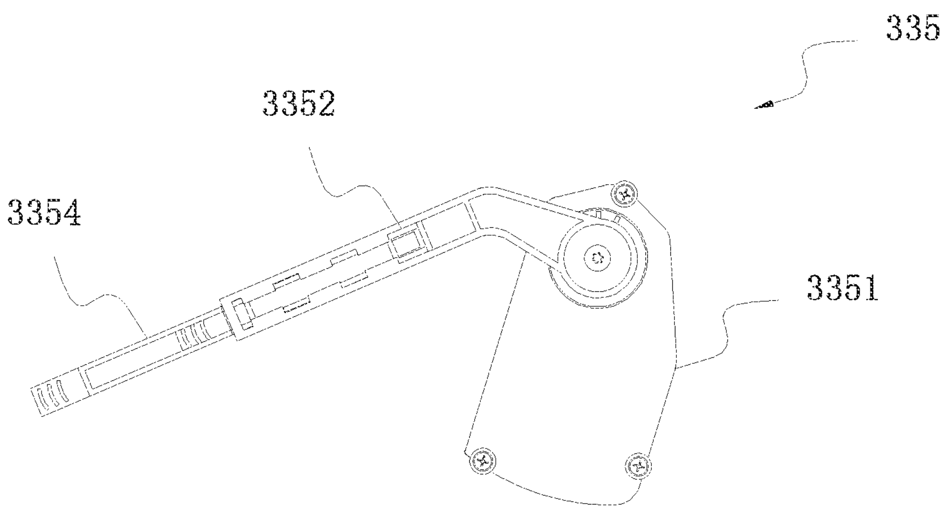
FIG. 14A is a perspective view illustrating the structure of a full grass detection device in a first state.
Figure 14B:
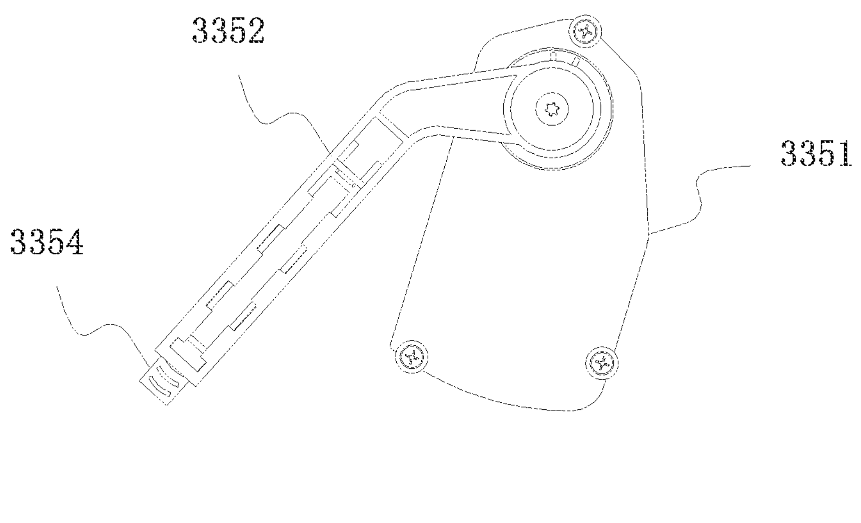
FIG. 14B is a perspective view illustrating the structure of a full grass detection device in a second state.
Figure 15:
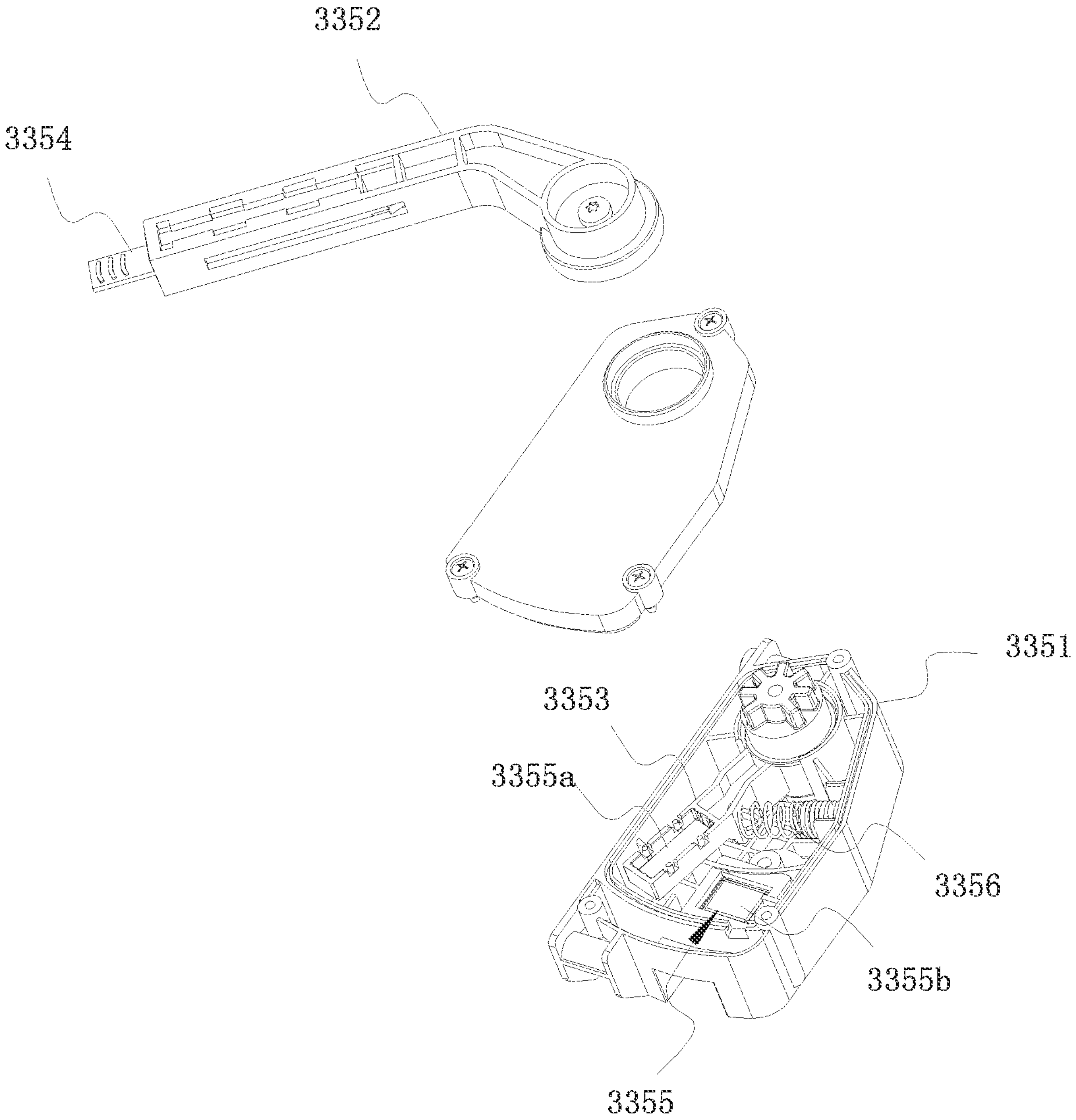
FIG. 15 is an exploded view illustrating the structure of the full grass detection device in FIG. 14B.

In some examples, as shown in FIGS. 5, 12, and 13, the accommodation device 31 has a grass collecting position, and the riding mower 100 further includes a grass collecting detection device 334 for detecting whether the accommodation device 31 is located at the grass collecting position. The grass collecting detection device 334 is disposed on the back plate assembly 33. In some examples, the grass collecting detection device 334 is disposed on the upper left or upper right of the upper back plate part 3321. Specifically, the grass collecting detection device 334 includes at least one non-contact switch. When the accommodation device 31 is mounted at the grass collecting position, the accommodation device 31 triggers the grass collecting detection device 334. Specifically, the grass collecting detection device 334 includes an elastic piece 3341, a first swingarm 3342, a second swingarm 3343, a mounting box 3344, and a Hall switch 3345. The mounting box 3344 is mounted to the front side of the upper back plate part 3321, and the second swingarm 3343 and the Hall switch 3345 are disposed in the mounting box 3344. The elastic piece 3341 is mounted to the rear side of the upper back plate part 3321.

One end of the first swingarm 3342 is rotatably connected to the mounting box 3344, and the other end of the first swingarm 3342 extends through the upper back plate part 3321 to the rear end of the elastic piece 3341. A magnet 3345*a* of the Hall switch 3345 is mounted on the second swingarm 3343, and a sensor 3345*b* of the Hall switch 3345 is mounted on the inner wall of the mounting box 3344. The first swingarm 3342 is drivingly connected to the second swingarm 3343. In some examples, the first swingarm 3342 and the second swingarm 3343 are connected by splines. In some examples, the grass collecting detection device 334 further includes a spring 3346 disposed in the mounting box 3344. One end of the spring 3346 abuts against the inner wall of the mounting box 3344, and the other end of the spring 3346 abuts against the second swingarm 3343.

The working principle of the grass collecting detection device 334 is as follows: when the accommodation device 31 is mounted at the installation position, the accommodation device 31 presses the elastic piece 3341, the elastic piece 3341 drives the first swingarm 3342 to rotate relative to the mounting box 3344, the first swingarm 3342 drives the second swingarm 3343 to rotate synchronously, and the second swingarm 3343 compresses the spring 3346 and drives the magnet 3345*a* to approach the sensor 3345*b*, thereby triggering the Hall switch 3345. In this manner, the grass collecting detection device 334 is provided so that the safety performance of the riding mower 100 can be improved, and the user can be prevented from activating the mowing function when the accommodation device 31 is not mounted. When the accommodation device 31 is removed from the installation position, the second swingarm 3343 rotates in the opposite direction under the action of the spring 3346 to drive the magnet 3345*a* of the Hall switch 3345 away from the sensor 3345*b*, the Hall sensor 3345 enters an untriggered state from a triggered state, the rotating second swingarm 3343 drives the first swingarm 3342 to rotate synchronously, and the second swingarm 3343 drives the elastic piece 3341 to return to the original position.

The mounting box 3344 of the grass collecting detection device 334 in this example adopts a closed design so that the mounting box 3344 is waterproof and dustproof and has relatively high safety performance. In some examples, the first swingarm 3342 is designed in an arc hook shape so that the opening of the upper back plate part 3321 can be narrowed and the risk of the first swingarm 3342 getting stuck caused by the accumulation of grass clippings can be avoided. In addition, the riding mower 100 may experience bumps during traveling. To reduce the impact of the accommodation device 31 on the grass collecting detection device 334 during bumps, since the Hall switch needs to have a certain stroke before the Hall switch can be triggered, in this example, the function of the grass collecting detection device 334 is implemented by using the Hall switch. Those skilled in the art can also use other forms of detection devices to detect whether the accommodation device 31 is mounted.

During the working process of the riding mower 100, when the height of the grass clippings in the accommodation device 31 affects the grass intake at a grass inlet, the user needs to dump the grass clippings. In the traditional riding mower, whether the grass clippings in the accommodation device 31 need to be dumped is generally determined based on the experience of the user, and the timing is often too early or too late. To accurately determine the dumping time of the accommodation device, multiple checks are required, affecting the working efficiency.

Further, the riding mower 100 in the present application has the function of automatically reminding the user that the accommodation device 31 is full of grass. It is to be understood that when the grass clippings in the accommodation device 31 reach such an amount that the grass clippings need to be dumped, the user can know the case without getting out of the vehicle. As shown in FIG. 5 and FIGS. 14A to 15, the riding mower 100 further includes a full grass detection device 335 for detecting the state of the grass clippings in the accommodation device 31. The full grass detection device 335 is disposed on the back plate assembly 33 and located below the grass outlet 321.

Specifically, the full grass detection device 335 includes a mounting box 3351, a first swingarm 3352, a second swingarm 3353, a telescopic rod 3354, and a switch 3355. The mounting box 3351 is fixedly mounted to the lower back plate part 3322 and is disposed on the front side of the lower back plate part 3322. The second swingarm 3353 and the switch 3355 are disposed in the mounting box 3351. One end of the first swingarm 3352 is rotatably connected to the mounting box 3351, and the other end of the first swingarm 3352 extends through the lower back plate part 3322 into the accommodation device 31. In this example, the switch 3355 is a Hall switch, a magnet 3355*a* is mounted on the second swingarm 3353, and a sensor 3355*b* is mounted on the inner wall of the mounting box 3351. The first swingarm 3352 is drivingly connected to the second swingarm 3353. In some examples, the first swingarm 3352 and the second swingarm 3353 are connected by splines. In some examples, the full grass detection device 335 further includes a spring 3356 disposed in the mounting box 3351. One end of the spring 3356 abuts against the inner wall of the mounting box 3351, and the other end of the spring 3356 abuts against the second swingarm 3353. The switch 3355 may adopt different switch forms and may have different positions, and those skilled in the art should arrange the switch 3355 according to actual situations.

The working principle of the full grass detection device 335 is as follows: when the grass clippings enter the accommodation device 31 from the grass outlet 321, the grass clippings accumulate upward from the bottom of the accommodation device 31 and gradually press on the first swingarm 3352; and when the grass clippings pressing on the first swingarm 3352 reach a certain weight, the first swingarm 3352 rotates downward relative to the mounting box 3351, the first swingarm 3352 drives the second swingarm 3353 to rotate synchronously, and the second swingarm 3353 compresses the spring 3356 and drives the magnet 3355*a* to approach the sensor 3355*b*, thereby triggering the switch 3355. In this manner, the full grass detection device 335 is configured to automatically detect the state of the grass clippings in the accommodation device so that the user can accurately determine the time when it is necessary to clean the accommodation device 31 without looking at the accommodation device 31. When the grass clippings in the accommodation device 31 are cleaned or the accommodation device 31 is removed, the force applied to the first swingarm 3352 becomes smaller or disappears, the second swingarm 3353 rotates in the opposite direction under the action of the spring 3356 to drive the magnet 3355*a* of the switch 3355 away from the sensor 3355*b*, the switch 3355 enters the untriggered state from the triggered state, and the rotating second swingarm 3353 drives the first swingarm 3352 to rotate synchronously to return to the original position.

The user may adjust the length of the part of the telescopic rod 3354 inserted into the first swingarm 3352 according to the type of grass, the mowing height, and the conditions of dry grass or wet grass so that it is ensured that when a grass discharge signal is sent, the accommodation device is basically full of grass, the grass outlet 321 is not blocked by grass clippings, and grass can be discharged normally during mowing.

In some examples, the full grass detection device 335 further includes the telescopic rod 3354. The first swingarm 3352 is sleeved on the telescopic rod 3354. Specifically, the telescopic rod 3354 has a first state shown in FIG. 14A and a second state shown in FIG. 14B. It is to be understood that the grass collecting rate in the accommodation device 31 when the telescopic rod 3354 is in the first state and the full grass detection device 335 outputs the full grass signal is different from the grass collecting rate in the accommodation device 31 when the telescopic rod 3354 is in the second state and the full grass detection device 335 outputs the full grass signal. For example, when the lawn where the riding mower 100 is working is dry or the grass is relatively dry, the user adjusts the telescopic rod 3354 to the first state shown in FIG. 14A. When the lawn where the riding mower 100 is working is relatively wet, the user may adjust the telescopic rod 3354 to the second state shown in FIG. 14B. In this manner, the telescopic rod 3354 is provided on the first swingarm 3352 so that the state of the full grass detection device 335 can be adaptively adjusted according to the working conditions, and it is convenient for the user to adjust the grass collecting rate when the full grass reminder occurs.

In this example, the mounting box 3351 adopts a closed design and is waterproof and dustproof. Circles of multiple drainage holes are provided at the bottom of the mounting box 3351 so that mud and sand on the wheels can be effectively prevented from splashing into the mounting box 3351.

As shown in FIGS. 1 and 2, the operating assembly 50 of the riding mower 100 includes a control panel 51, a steering wheel assembly, and a pedal assembly. The pedal assembly includes an accelerator pedal 531 and a brake pedal 532. The control panel 51 and the steering wheel assembly are disposed between the seat 92 and the front cover 23. In this example, the steering wheel assembly includes a steering wheel 521 operable by the user to control the traveling direction of the riding mower 100. The control panel 51 is connected to the front cover 23 and includes a display device 511 and multiple operating members 512. The display device 511 is used for displaying the state information of the riding mower 100. The multiple operating members 512 are operable by the user to control the traveling assembly 60 and the mowing assembly 10. The multiple operating members 512 may include switches, buttons, gears, or the like. The multiple operating members 512 may be configured in different shapes and sizes so that the user can operate different operating members 512 without looking at the operating members 512.

Figure 16:
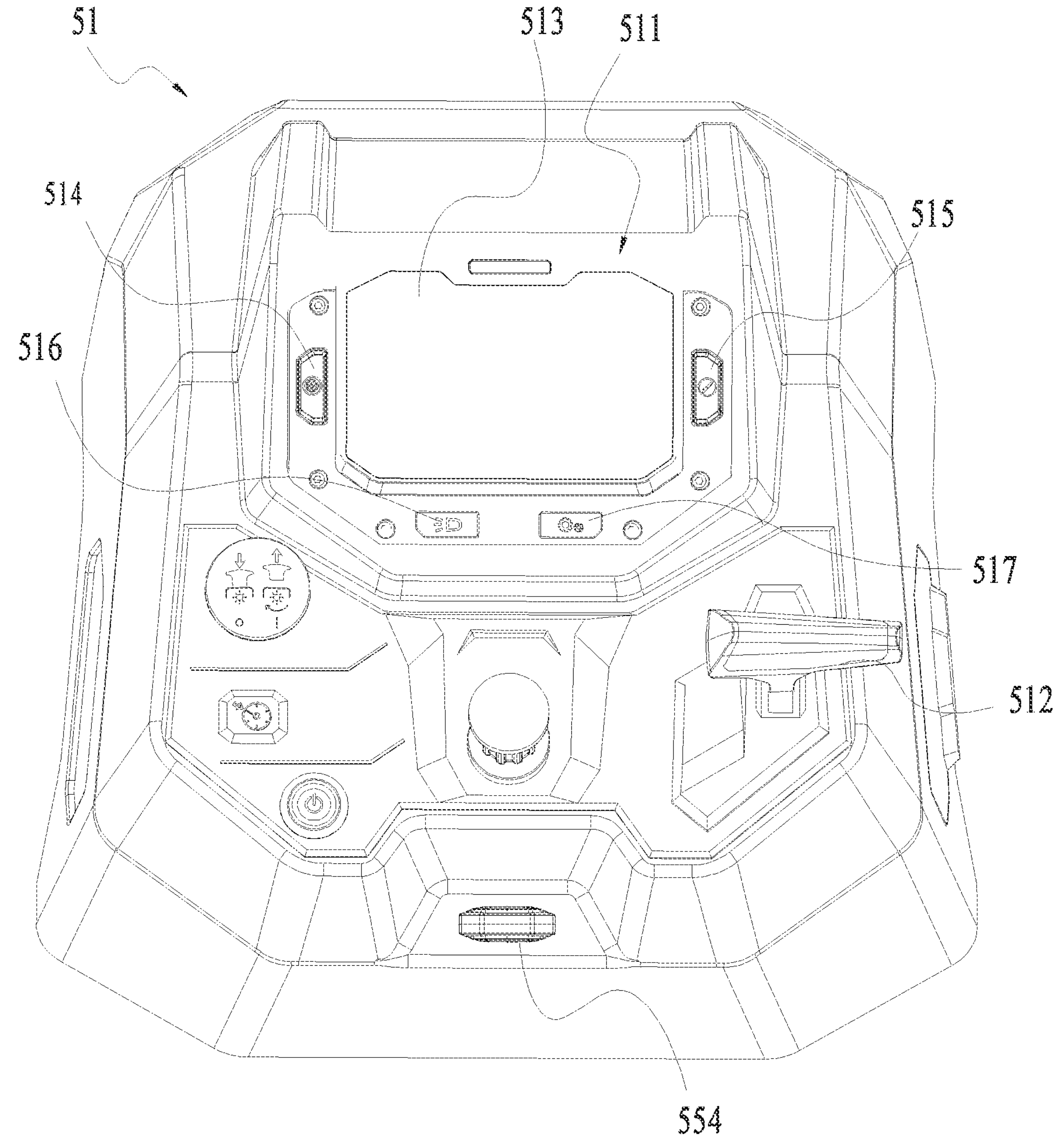
FIG. 16 is a perspective view illustrating the structure of a control panel of the riding mower in FIG. 1.
Figure 17:
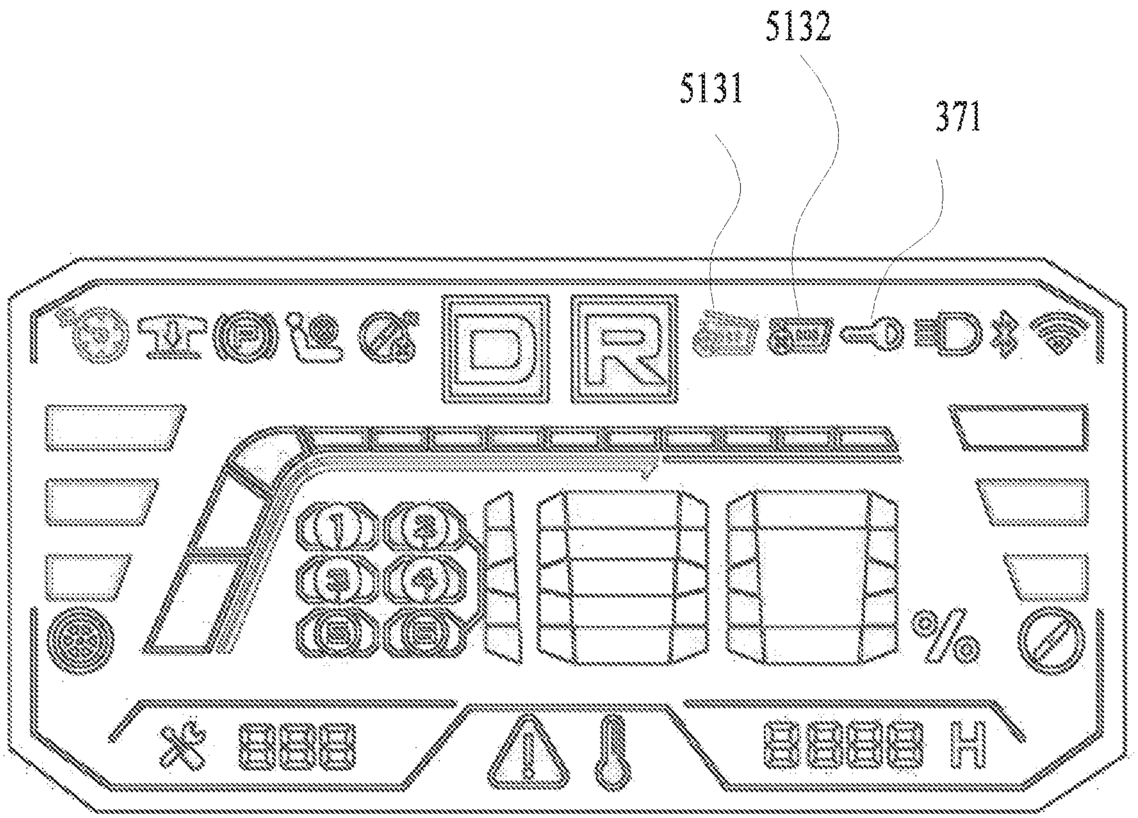
FIG. 17 is a schematic view of a display interface of the control panel in FIG. 16.

Specifically, as shown in FIGS. 16 and 17, the display device 511 has a display interface 513 for displaying the working state of the riding mower 100. The display interface 513 is understood as a display region directly observed by the user. Different state information may be displayed on the display interface 513 as needed. The display interface 513 may display the traveling speed of the traveling assembly 60, the rotational speed of the mowing elements 12, the energy efficiency state of the riding mower 100, the remaining power information of the power supply device 40, warning information, fault information, the remaining operation time, and the like.

In this example, the display interface 513 is further configured to display at least the state of the grass collecting mechanism 30. The state of the grass collecting mechanism 30 includes a full grass state 5131, a grass basket state 5132, plug installation 5133, or a grass collecting pipe installation instruction 5234. In addition, the display interface 513 is further configured to display the operation information of the traveling electric motor 63 or information about the power supply device 40 for supplying power to the riding mower 100.

In some examples, the control panel 51 further includes multiple buttons arranged around the display interface 513, for example, a first button 514 and a second button 515 used for the user to operate to adjust the maximum traveling speed and the rotational speed of the blades of the riding mower 100, respectively. The first button 514 and the second button 515 may be separately disposed on the left and right sides of the display interface 513. Further, a third button 516 is provided around the display interface 513 and is used for the user to operate to control the lighting function of the riding mower 100. Further, a fourth button 517 is provided around the display interface 513. The fourth button 517 is operable by the user so that the riding mower 100 enters different driving modes, such as a sport mode, a normal mode, and a control mode. In this manner, the user may select different driving modes according to personal preferences, thereby improving the user experience of the riding mower 100. The first button 514, the second button 515, the third button 516, and the fourth button 517 may all be displayed on the display interface 513 accordingly.

Figure 18:
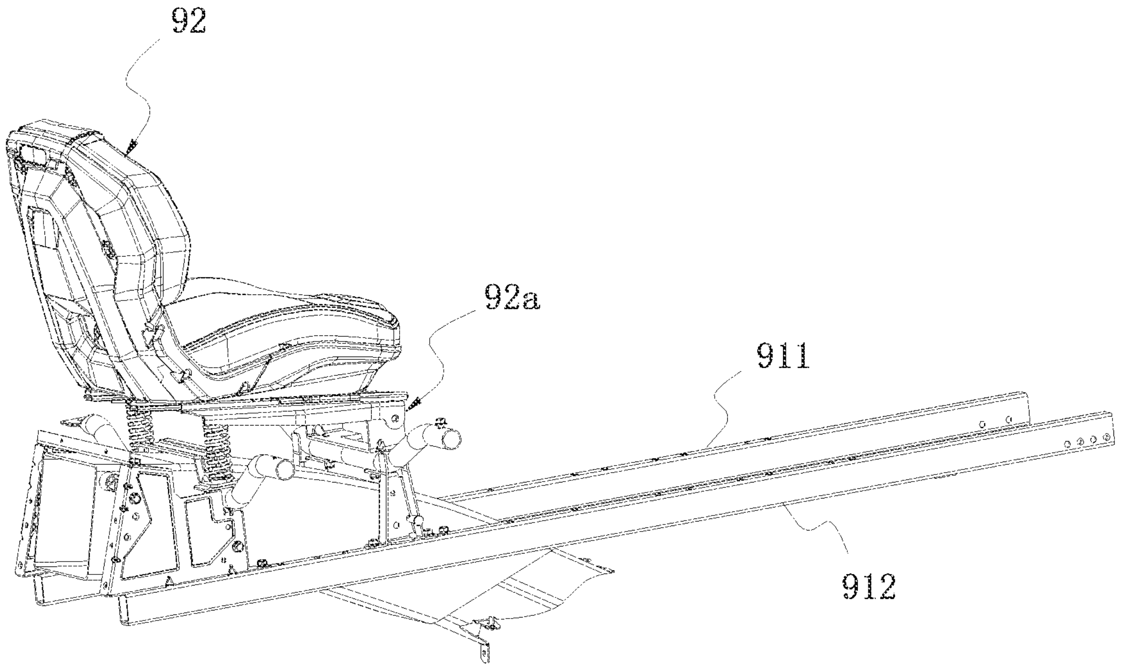
FIG. 18 is a perspective view illustrating the structure of a seat, a grass collecting pipe, and a support assembly of the seat of the riding mower in FIG. 1.
Figure 19:
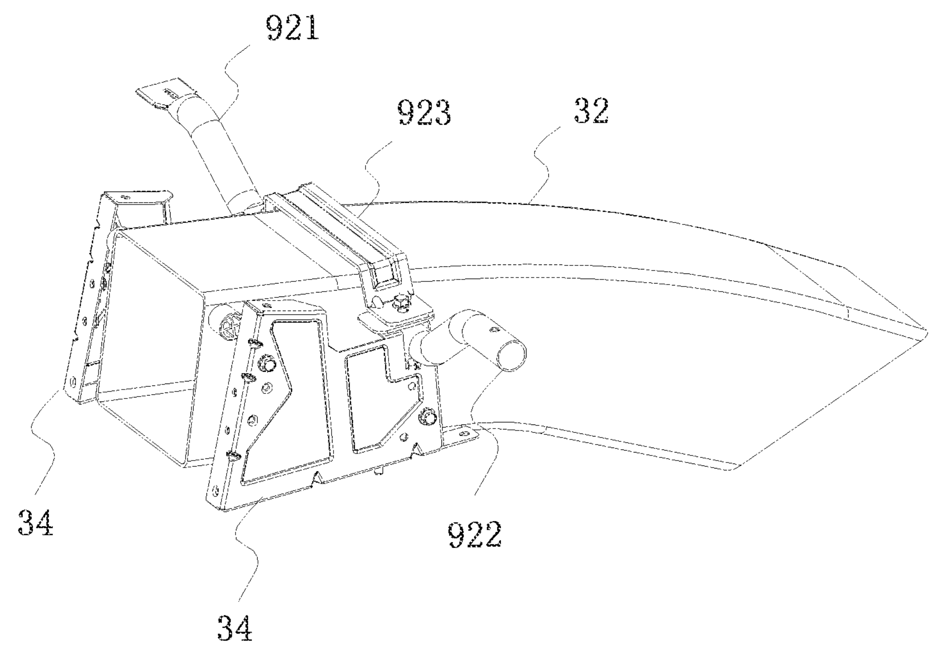
FIG. 19 is a perspective view illustrating the structure of the grass collecting pipe and the support assembly in FIG. 18.
Figure 20:
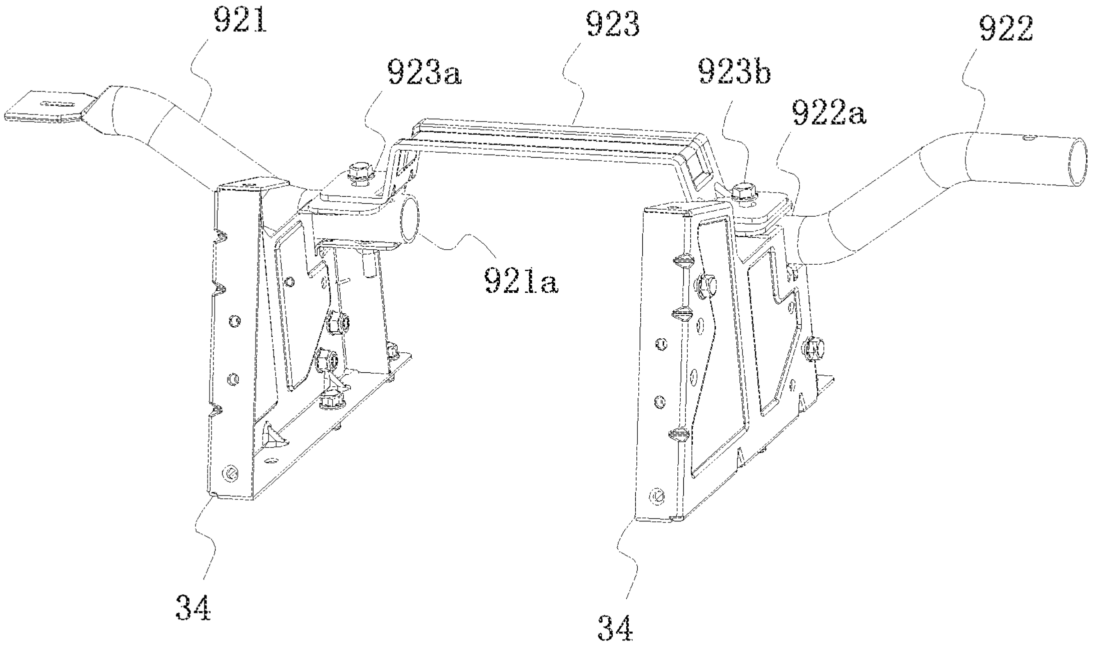
FIG. 20 is a perspective view illustrating the structure of the support assembly in FIG. 18.

In some examples, as shown in FIGS. 18 to 20, the seat 92 is located above the grass collecting pipe 32 in the up and down direction. The seat 92 is mounted to a support assembly 92*a* and supported by the support assembly 92*a*. The support assembly 92*a* includes a first support member 921 and a second support member 922 connected to the first longitudinal beam 911 and the second longitudinal beam 912, respectively. Specifically, a first end 921*a* of the first support member 921 is fixed to the left side of the seat 92 and fixed to the fixing bracket 34 on the first longitudinal beam 911. A first end 922*a* of the second support member 922 is fixed to the right side of the seat 92 and fixed to the fixing bracket 34 on the second longitudinal beam 912. To ensure the relative positions of the left and right support members and improve the overall support strength of the seat, in this example, the support assembly 92*a* further includes a connector 923 disposed between the first support member 921 and the second support member 922. The connector 923 is located between the seat 92 and the grass collecting pipe 32 in the up and down direction. Specifically, a first end 923*a* of the connector 923 is connected to the first end 921*a* of the first support member 921, and a second end 923*b* of the connector 923 is connected to the second end 922*a* of the second support member 922. In some examples, the connector 923 is a sheet metal part, has relatively high strength, and can better support the seat 92. The first support member 921, the second support member 922, and the connector 923 may also be integrally formed.

Figure 21:
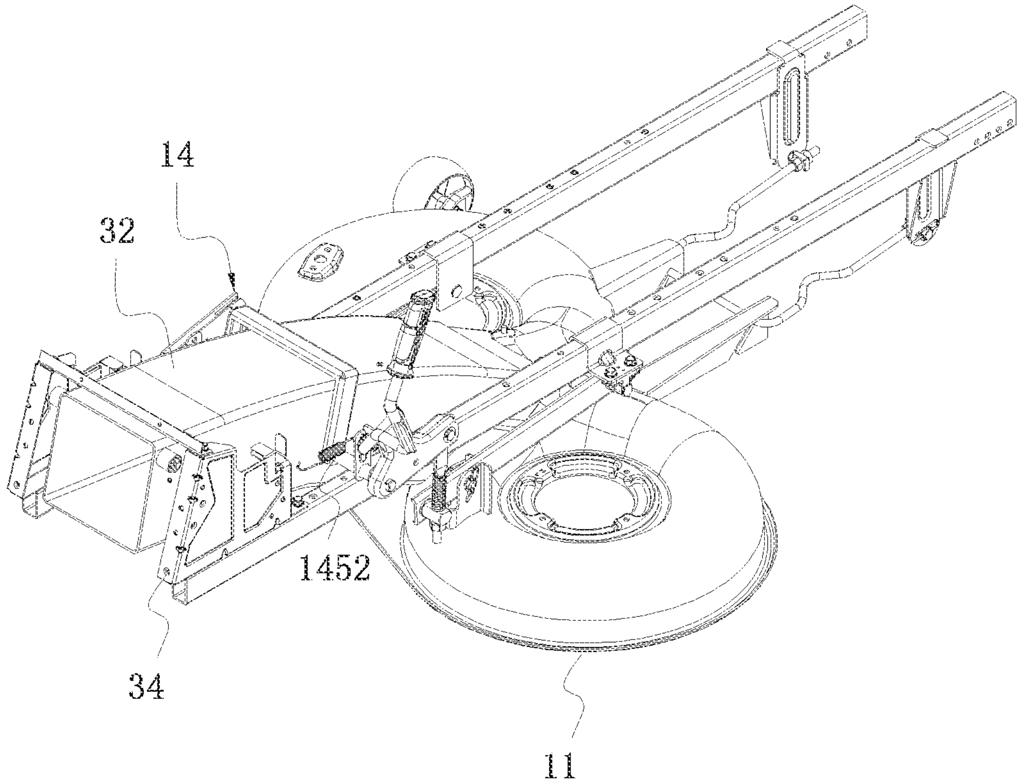
FIG. 21 is a perspective view illustrating the structure of a mowing assembly, a grass collecting pipe, and a height adjustment member in FIG. 1.
Figure 22:
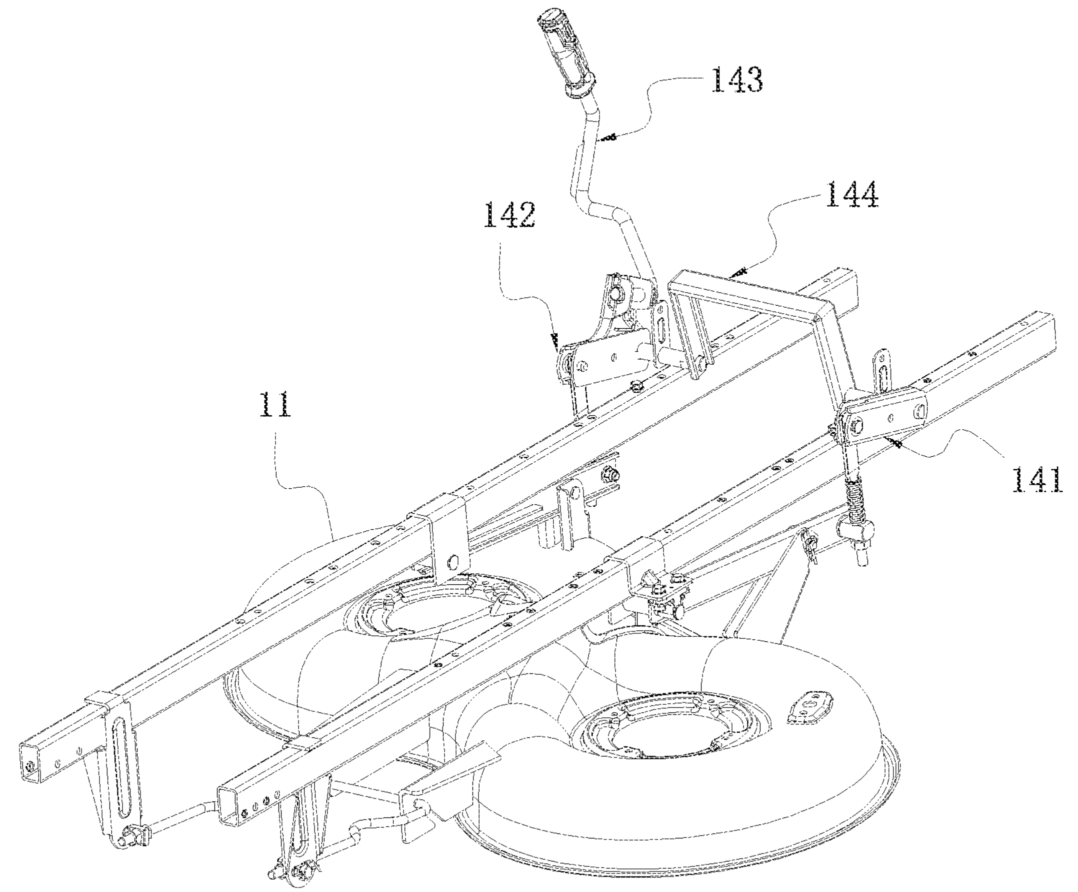
FIG. 22 is a perspective view illustrating the structure of the height adjustment member and a frame in FIG. 21.
Figure 23:
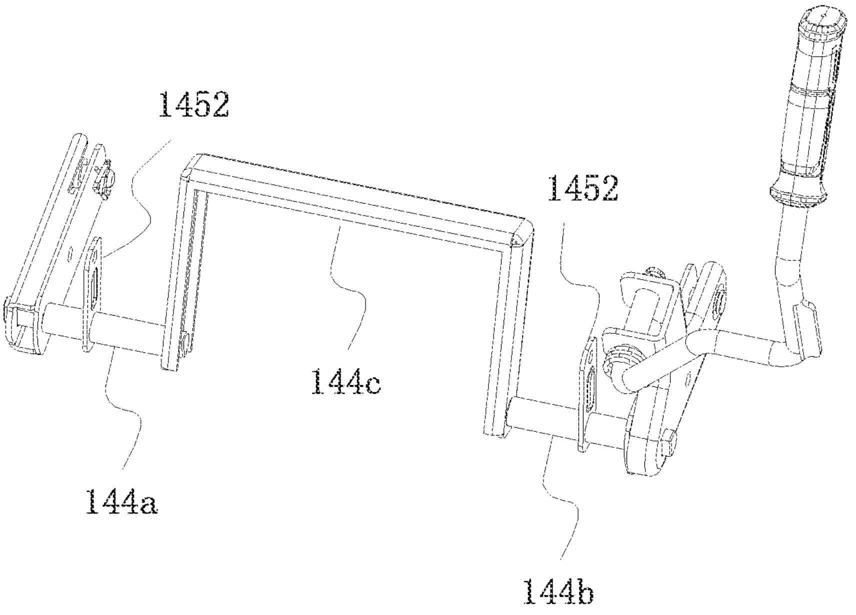
FIG. 23 is a perspective view illustrating the structure of the height adjustment member in FIG. 21.

In some examples, as shown in FIGS. 21 to 23, the riding mower 100 further includes a height adjustment member 14 for adjusting the height of the deck 11. In other words, the user operates the height adjustment member 14 to control the height of the mowing elements 12 to achieve different cutting effects.

Specifically, the height adjustment member 14 includes a first height adjustment assembly 141, a second height adjustment assembly 142, a height adjustment operating assembly

143 for driving the first height adjustment assembly 141 or the second height adjustment assembly 142, and a second connection assembly 144 disposed between the first height adjustment assembly 141 and the second height adjustment assembly 142. The first height adjustment assembly 141 is fixedly connected to the left side of the deck 11, and the second height adjustment assembly 142 is fixedly connected to the right side of the deck 11. One end of the second connection assembly 144 is fixedly connected to the first height adjustment assembly 141, and the other end of the second connection assembly 144 is fixedly connected to the second height adjustment assembly 142. The deck adjustment process of the riding mower 100 is as follows: the user operates the height adjustment operating assembly 143 to drive the second height adjustment assembly 142 to move to adjust the right side of the deck 11 to move in the up and down direction, the moving second height adjustment assembly 142 drives the second connection assembly 144 to move, and the second connection assembly 144 drives the first height adjustment assembly 141 to drive the left side of the deck 11 to move in the up and down direction.

The second connection assembly 144 includes a first part 144*a*, a second part 144*b*, and a third part 144*c*. The first part 144*a* is connected to the first height adjustment assembly 141, the second part 144*b* is connected to the second height adjustment assembly 142, one end of the third part 144*c* is connected to the first part 144*a*, and the other end of the third part 144*c* is connected to the second part 144*b*. The first height adjustment assembly 141 drives the first part 144*a* to move, the first part 144*a* drives the third part 144*c* to move, and the third part 144*c* drives the second part 144*b* to move, thereby driving the second height adjustment assembly 142 to move. Specifically, the third part 144*c* is at least partially disposed on the upper part of the grass collecting pipe 32. In some examples, the third part 144*c* is configured to be a sheet metal part.

In some examples, the height adjustment member 14 further includes an elastic assembly for reducing the operating force of the user operating the height adjustment operating assembly 143, thereby improving the user experience. Specifically, the elastic assembly includes a spring 1451 and a swingarm 1452. The swingarm 1452 is mounted to the first part 144*a* or the second part 144*b* of the second connection assembly 144. One end of the spring 1451 is mounted to the swingarm 1452, and the other end of the spring 1451 is mounted to the fixing bracket 34. In this manner, when the user operates the height adjustment operating member 143, the height adjustment operating member 143 tends to move to a preset position under the force of the spring 1451, which not only helps the user save effort but also provides a better operating feel.

Figure 24:
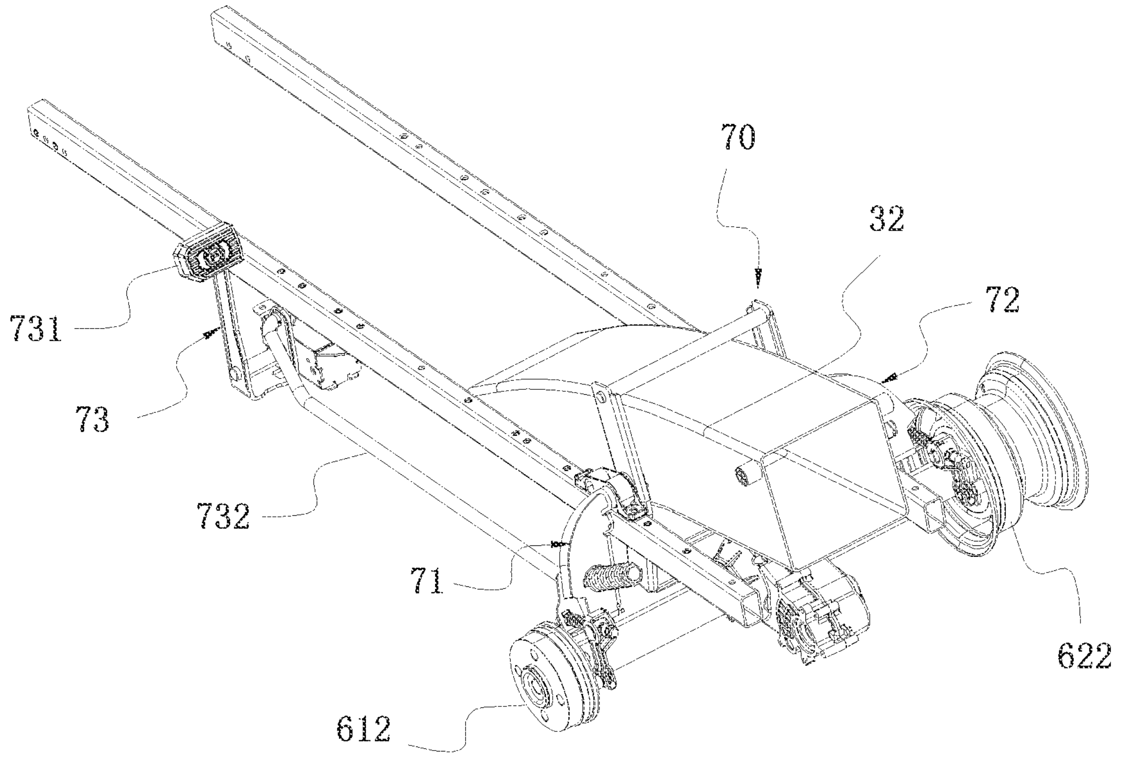
FIG. 24 is a perspective view illustrating the structure of a brake mechanism, a grass collecting pipe, and a frame in FIG. 1.
Figure 25:
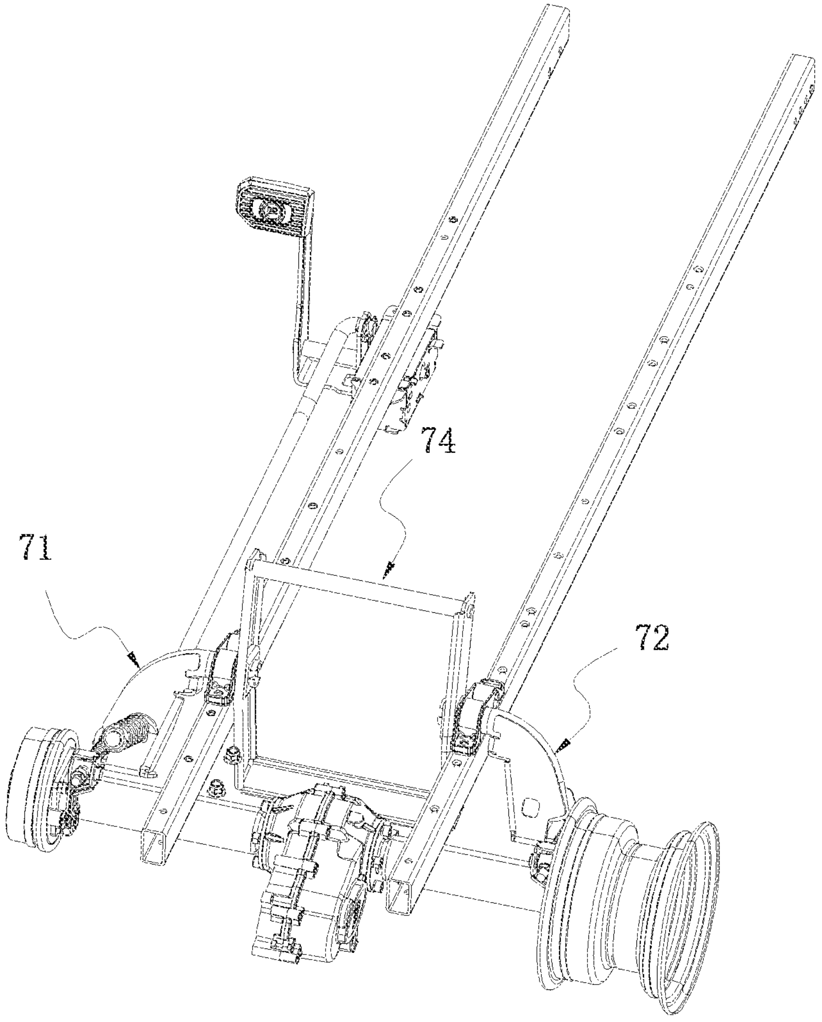
FIG. 25 is a perspective view illustrating the structure of the brake mechanism and the frame in FIG. 24.
Figure 26:
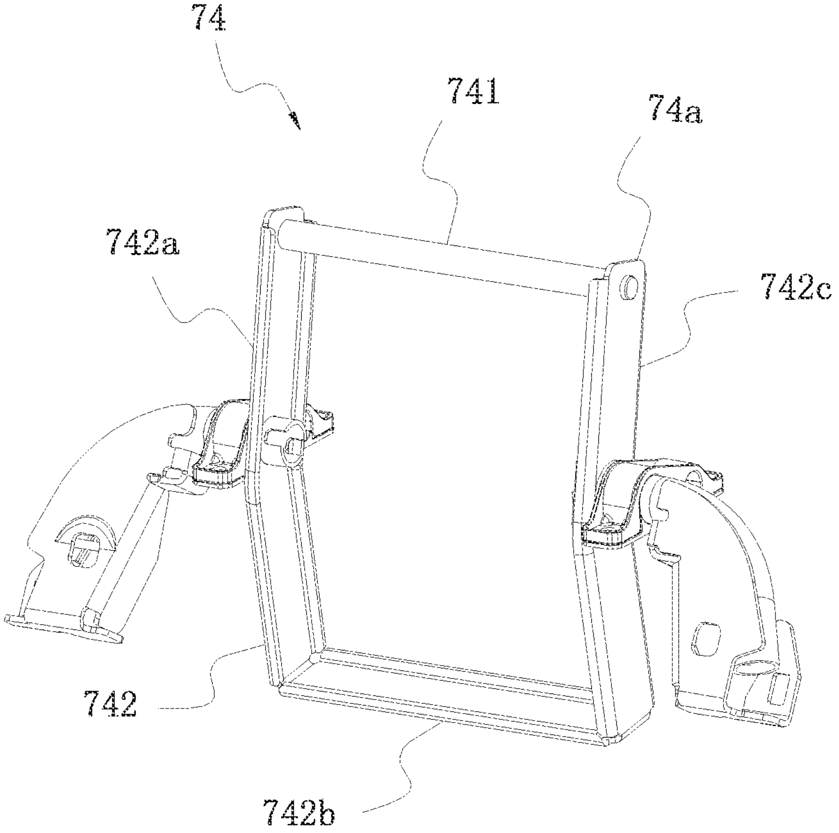
FIG. 26 is a perspective view illustrating the structure of the brake mechanism and the frame in FIG. 24.

In some examples, as shown in FIGS. 24 to 26, the riding mower 100 further includes a brake mechanism 70 for braking the traveling assembly 60 during traveling. The brake mechanism 70 includes a first brake assembly 71 for braking the rear left traveling wheel 612 and a second brake assembly 72 for braking the rear right traveling wheel 622. The brake mechanism 70 further includes a brake operating assembly 73 operable by the user for driving the first brake assembly 71 or the second brake assembly 72.

Specifically, the brake operating assembly 73 includes a brake pedal 731 and a drive rod 732. The drive rod 732 is disposed between the brake pedal 731 and the first brake assembly 71 and is used for transmitting a braking force on the brake pedal 731 to the first brake assembly 71. The brake mechanism 70 further includes a first connection assembly 74 connecting the first brake assembly 71 to the second brake assembly 72. The first connection assembly 74 includes a connector 741 located on the upper side or the lower side of the grass collecting pipe 32. The braking process of the riding mower 100 is as follows: the user depresses the brake pedal 731 forward to drive the drive rod 732 to move forward, the drive rod 732 drives the first brake assembly 71 to brake the rear left traveling wheel 612, the first brake assembly 71 drives, through the first connection assembly 74, the second brake assembly 72 to move synchronously during the braking process, and the second brake assembly 72 brakes the rear right traveling wheel 622.

In some examples, the first connection assembly 74 further includes a reinforcement part 742 connected to two ends of the connector 741. The reinforcement part 742 and the connector 741 form a bracket 74*a*, and the grass collecting pipe 32 is located in the bracket 74*a*. Specifically, the reinforcement part 742 includes a first part 742*a*, a second part 742*b*, and a third part 742*c*. The first part 742*a* is connected to the first brake assembly 71, the third part 742*c* is connected to the second brake assembly 72, and the second part 742*b* connects the first part 742*a* to the third part 742*c*. To improve the force transmission efficiency on two sides of the first connection assembly 74 and ensure the consistency of braking on two sides, the reinforcement part 742 is set in a "U" shape and is an integrally formed sheet metal part.

Figure 27:
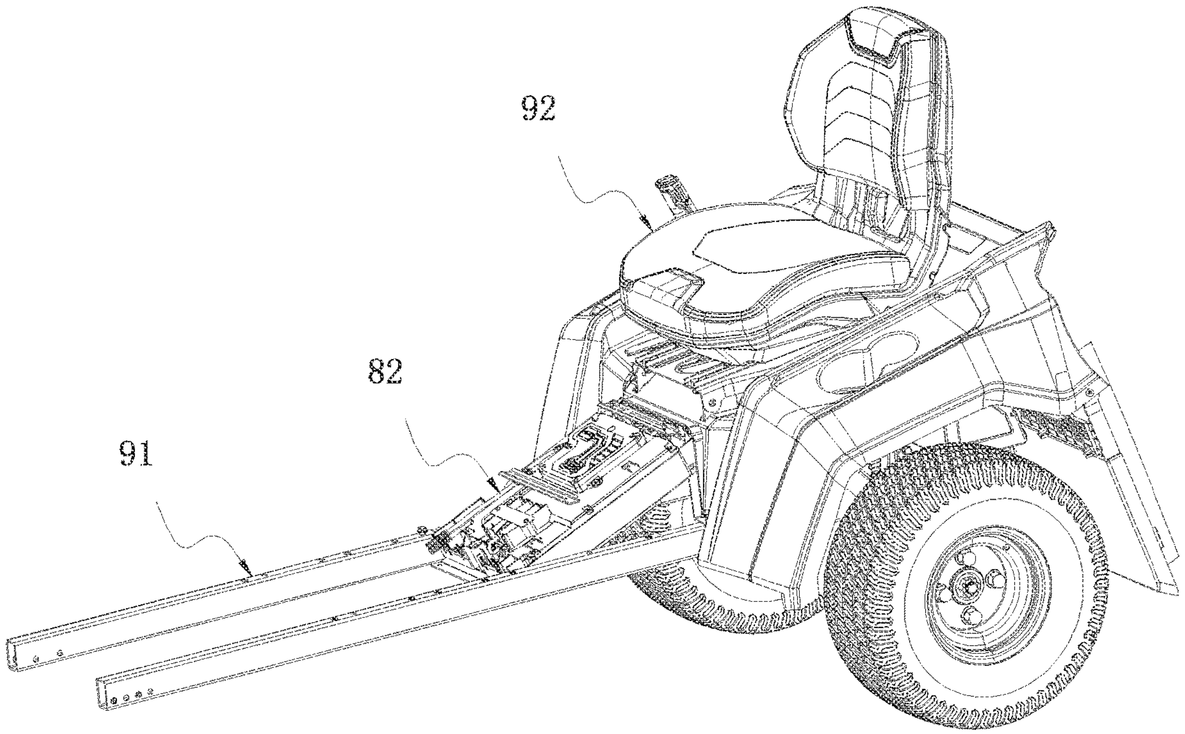
FIG. 27 is a perspective view illustrating the structure of a seat and a control device in FIG. 1.
Figure 28:
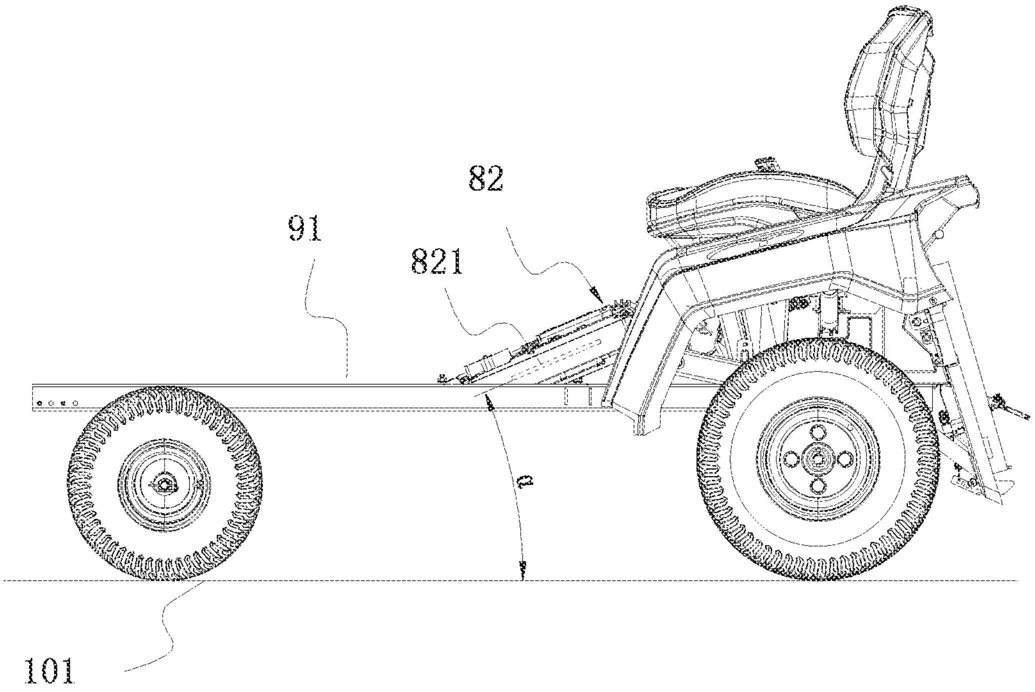
FIG. 28 is a perspective view illustrating the structure of the seat and the control device in FIG. 27 from another perspective.

In some examples, as shown in FIGS. 2, 27, and 28, the riding mower 100 further includes a control device 80 for controlling the operation state. The control device 80 includes a housing 81 and a circuit board assembly 82 disposed in the housing 81. Specifically, the control device 80 is mounted on the frame 91 and is located between a front traveling assembly and a rear traveling assembly. The control device 80 is at least partially located on the front side of the seat 92. In some examples, the distance L2 between the upper end of the control device 80 and the seat surface of the seat 92 is greater than or equal to 0 and less than or equal to 800 mm. In some examples, the distance L2 between the upper end of the control device 80 and the seat surface of the seat 92 is greater than or equal to 100 mm and less than or equal to 400 mm.

In some examples, the distance L2 between the upper end of the control device 80 and the seat surface of the seat 92 is greater than or equal to 200 mm and less than or equal to 300 mm. The upper end of the preceding control device 80 should be understood as the highest point of the housing 81. The seat surface of the preceding seat should be understood as the lowest point of the seat surface.

In some examples, the control device 80 is inclined relative to the first plane 101 supporting the traveling assembly 60. Specifically, the circuit board assembly 82 is inclined relative to the first plane 101 supporting the traveling assembly 60. The circuit board assembly 82 includes a driver circuit for driving the traveling electric motor. The driver circuit is disposed on a printed circuit board 821, and the printed circuit board is inclined relative to the first plane 101. In some examples, the included angle α between the plane where the printed circuit board 821 is located and the first plane 101 is greater than or equal to 0° and less than or equal to 85°. In some examples, the included angle α between the plane where the printed circuit board 821 is located and the first plane 101 is greater than or equal to 10° and less than or equal to 30°. In some examples, the included angle α between the plane where the printed circuit board 821 is located and the first plane 101 is greater than or equal to 30° and less than or equal to 50°. In some examples, the included angle α between the plane where the printed circuit board 821 is located and the first plane 101 is greater than 50° and less than or equal to 70°. In some examples, the included angle α between the plane where the printed circuit board 821 is located and the first plane 101 is greater than or equal to 70° and less than or equal to 85°. In some examples, the included angle α between the plane where the printed circuit board 821 is located and the first plane 101 is equal to 23°. In this manner, the control device 80 is inclined so that the control device 80 can be prevented from interfering with the grass collecting pipe 32, and at the same time, without increasing the length of the riding mower 100, more space is reserved for the user, making the structure of the whole machine more compact. In some examples, the control device 80 may be placed horizontally. The preceding horizontal placement may be understood as follows: the extension direction of the housing 81 is basically parallel to the first plane 101, or the extension direction of the printed circuit board 821 is basically parallel to the first plane 101.

Figure 4:
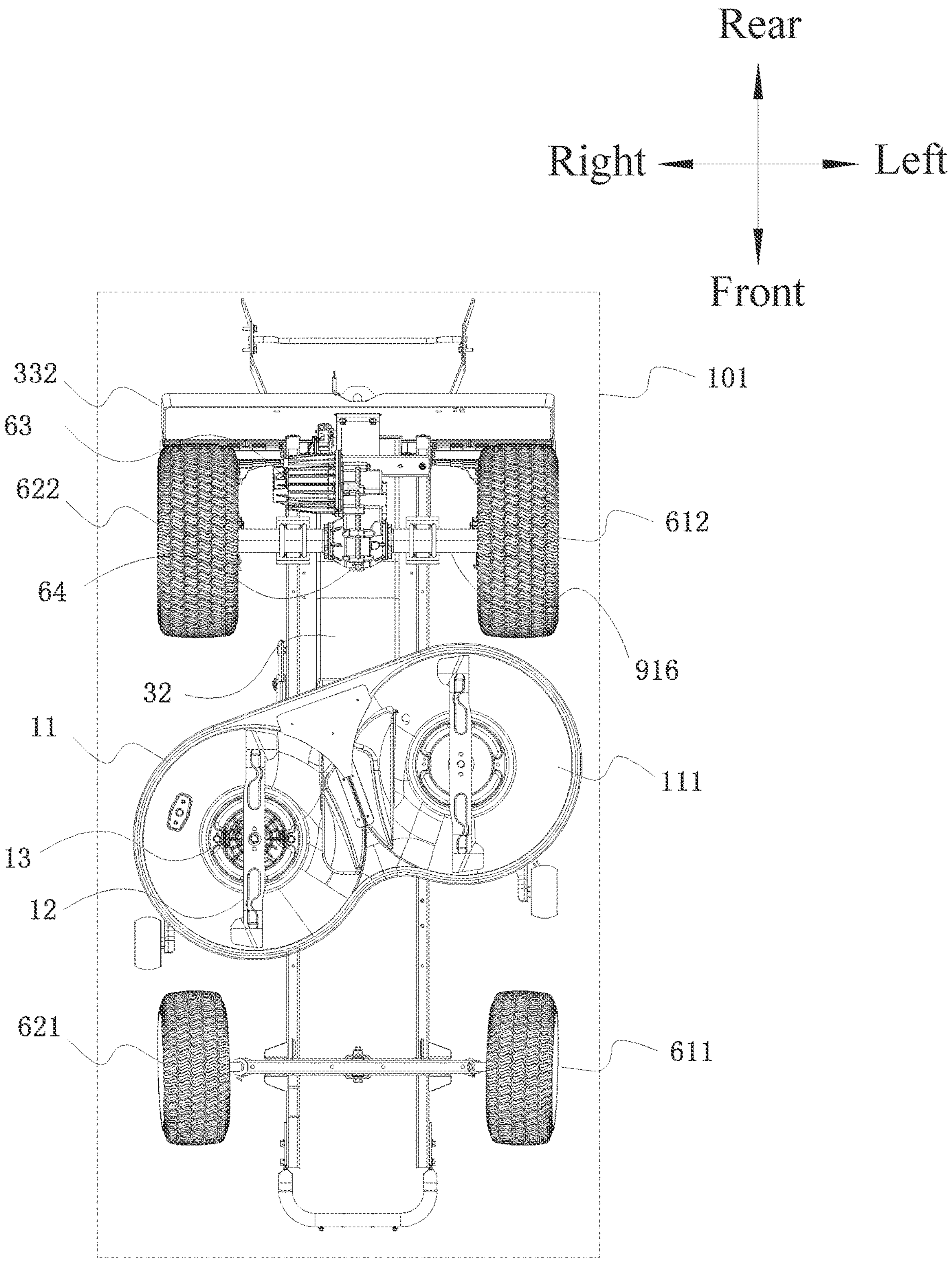
FIG. 4 is a top view of a three-dimensional structure in FIG. 3.
Figure 29:
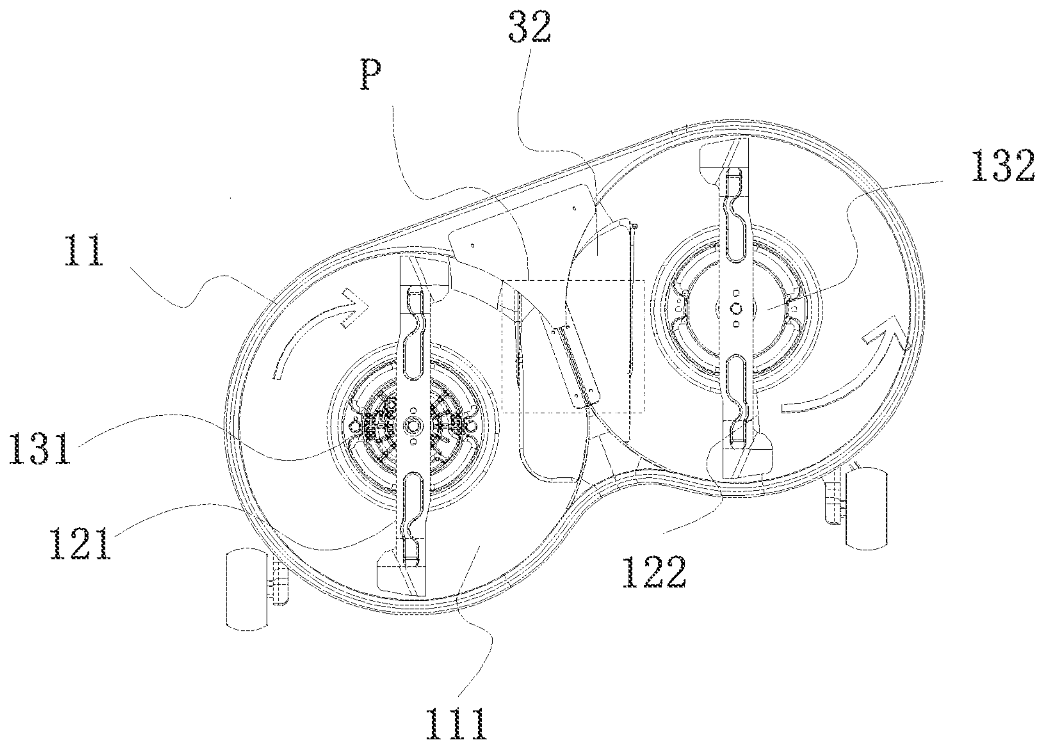
FIG. 29 is a perspective view illustrating the structure of a mowing assembly in FIG. 1.

The grass collecting pipe 32 of the riding mower 100 is set at the middle position, so the mowing assembly 10 not only needs to rotate at high speed to cut the grass during operation, but also needs to generate a backward airflow in the mowing space 111 of the deck 11 to bring the cut grass clippings into the grass collecting pipe 32 from the rear part of the deck 11, and finally, the grass is stored in the accommodation device 31. In some examples, as shown in FIGS. 4 and 29, the mowing elements 12 include a first mowing element 121 and a second mowing element 122. The mowing motors 13 include a first mowing motor 131 and a second mowing motor 132. The first mowing motor 131 drives the first mowing element 121, and the second mowing motor 132 drives the second mowing element 122. Specifically, the first mowing element 121 and the second mowing element 122 are adjacent to each other, and one of the first mowing element 121 and the second mowing element 122 is disposed obliquely in front of the other one of the first mowing element 121 and the second mowing element 122.

In some examples, the first mowing element 121 rotates clockwise in FIG. 29 and the second mowing element 122 rotates counterclockwise so that a combined airflow directed from front to back is generated in the region P closest to the rotation paths of the first mowing element 121 and the second mowing element 122 in the deck 11, thereby discharging the cut grass clippings into the grass collecting pipe 32 together with the combined airflow. In other words, the directions of rotation and the rotational speeds of the first mowing element 121 and the second mowing element 122 are set so that the cut grass clippings flow to the accommodation device 31 through the grass collecting pipe 32. It is also feasible that the first mowing element 121 is configured to rotate counterclockwise and the second mowing element 122 is configured to rotate clockwise. In some examples, it is also feasible that the first mowing element 121 and the second mowing element 122 are configured to rotate counterclockwise or clockwise at different rotational speeds or the same rotational speed at the same time. In this manner, the efficiency of grass clippings entering the grass collecting pipe 32 can be improved just by setting the states of the first mowing element 121 and the second mowing element 122, thereby improving the grass collecting efficiency.

Figure 30:
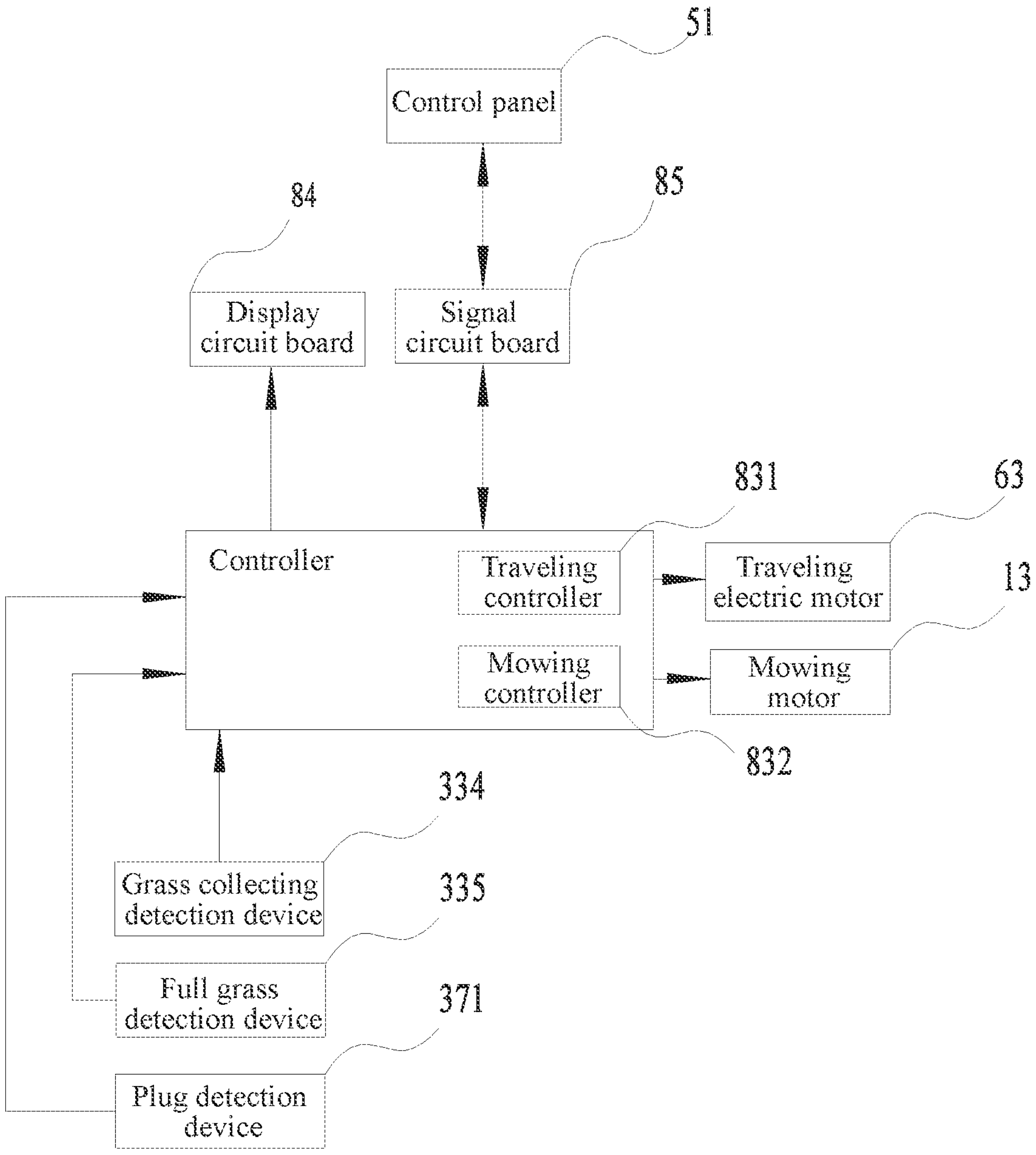
FIG. 30 is a control schematic diagram of a circuit system of the riding mower in FIG. 1.

As shown in FIG. 30, the riding mower further includes a circuit system. The circuit system includes a controller 83, a display circuit board 84, a signal circuit board 85, a traveling driver circuit 86, and a mowing driver circuit 87. Further, the controller 83 includes a traveling controller 831 and a mowing controller 832. The traveling controller 831 is electrically connected to the traveling driver circuit 86 to output a traveling control signal to the traveling driver circuit 86 to control the state of the traveling electric motor 63. The mowing controller 832 is electrically connected to the mowing driver circuit 87 to output a mowing control signal to the mowing driver circuit 87 to control the state of the mowing motors 13. The controller 83 is further electrically connected to the signal circuit board 85 to receive switching signals from the operating members and buttons on the control panel 51. The controller 83 is electrically connected to the display circuit board 84 through the signal circuit board 85 to control the display state on the display interface 513. The controller 83 is further connected to the grass collecting detection device 334, the full grass detection device 335, and a plug detection device 371 so that the state of the accommodation device 31 and the state of the plug assembly 37 are displayed on the display device 511 through the display circuit board 84.

Figure 31:
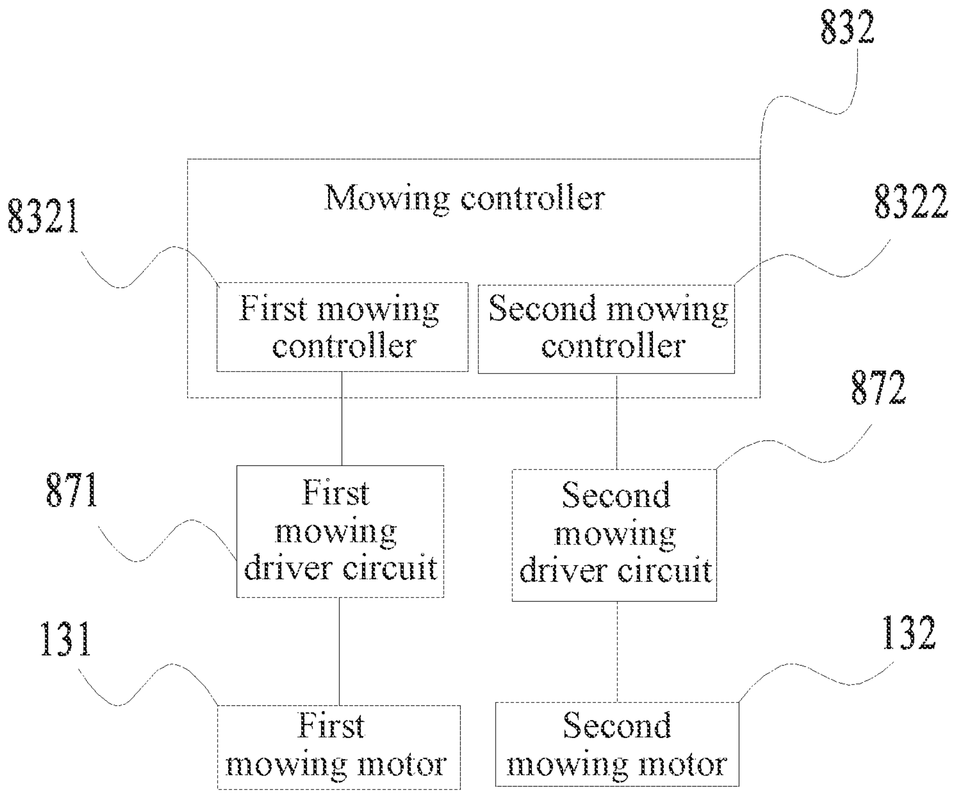
FIG. 31 is a control schematic diagram of a first mowing motor and a second mowing motor in FIG. 30.
Figure 32:
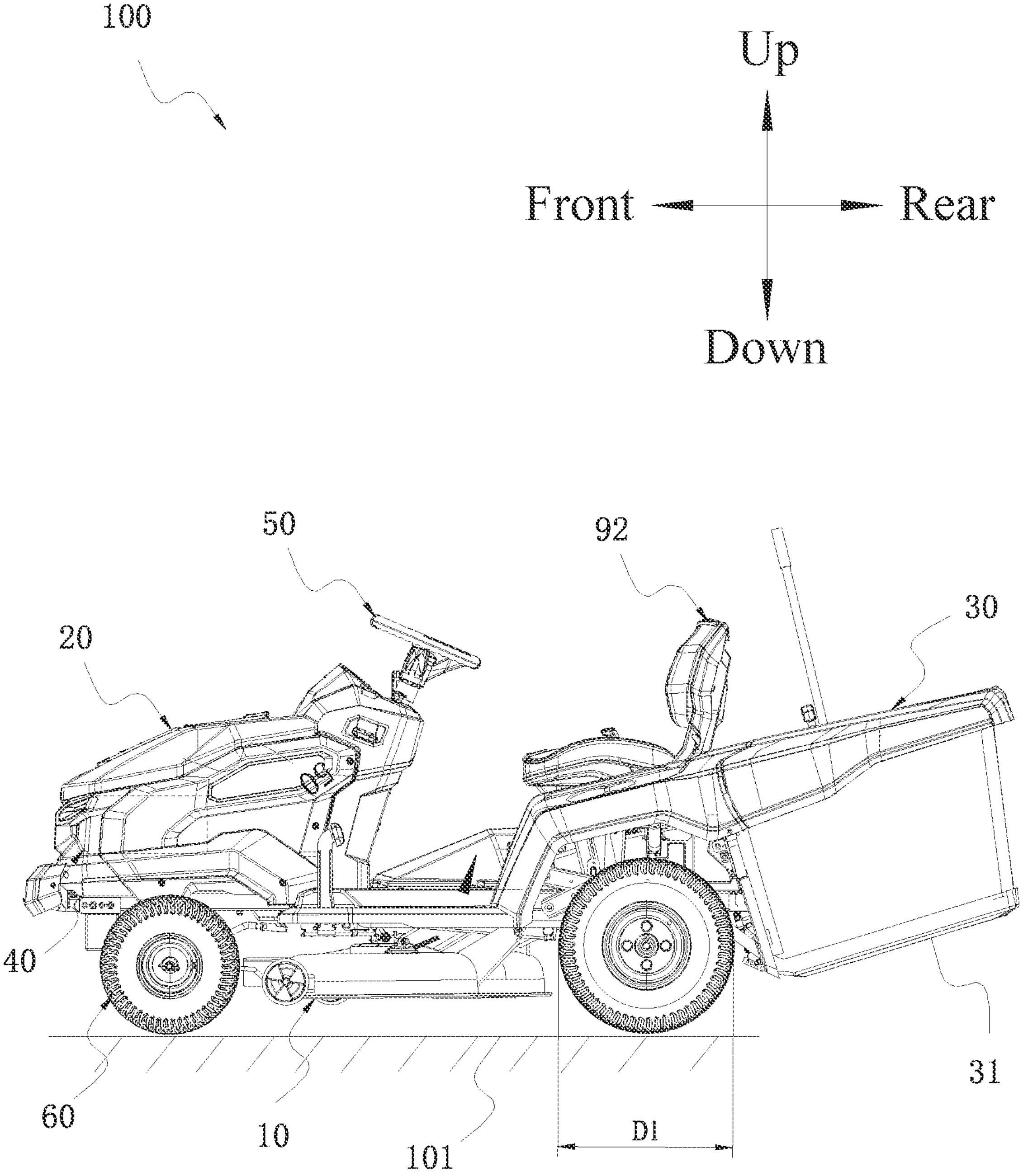
FIG. 32 is a side view of a riding mower according to an example of the present application.
Figure 33:
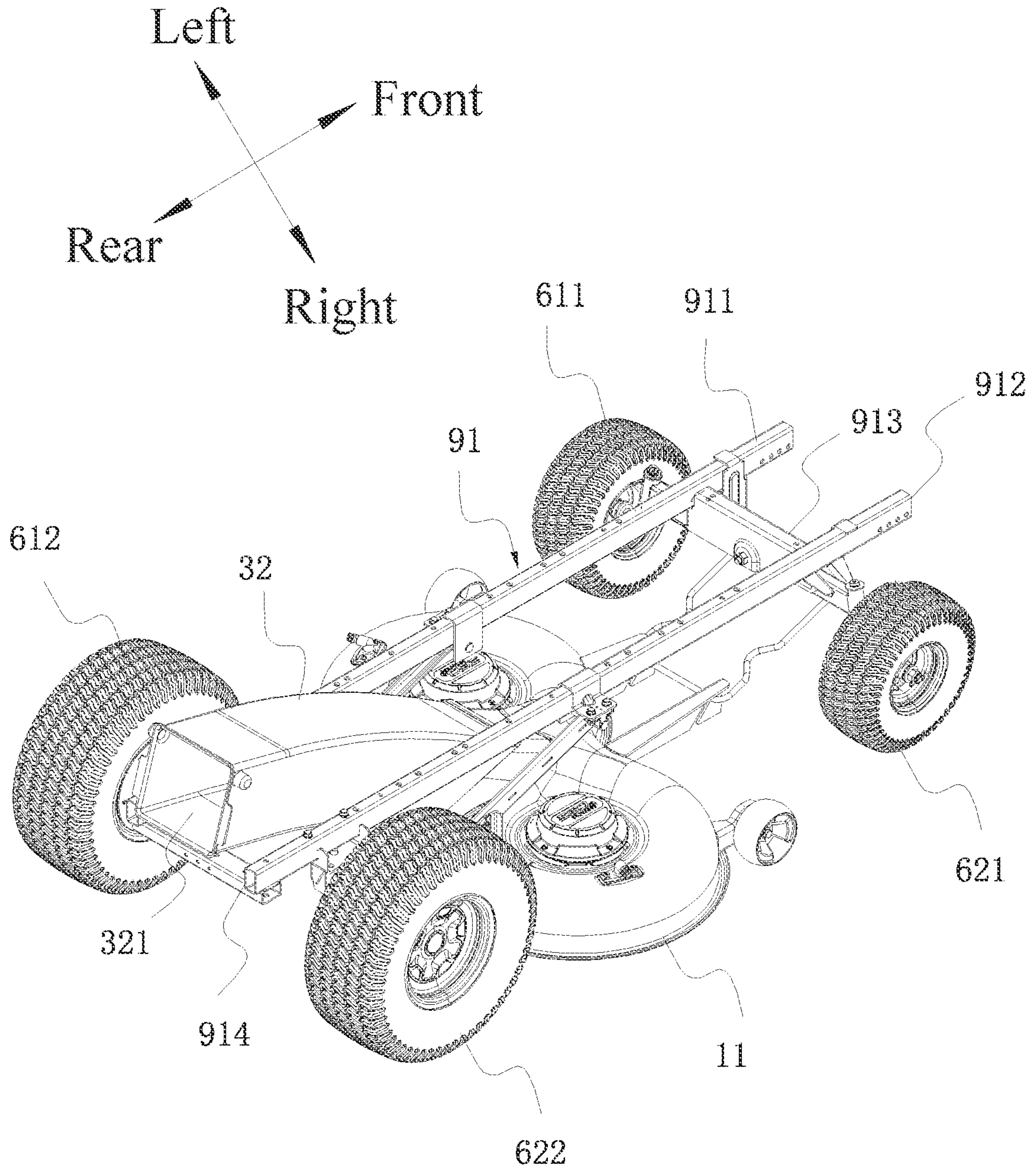
FIG. 33 is a perspective view of a mowing assembly, a grass collecting pipe, a traveling assembly, and a frame of a riding mower in FIG. 32.
Figure 34:
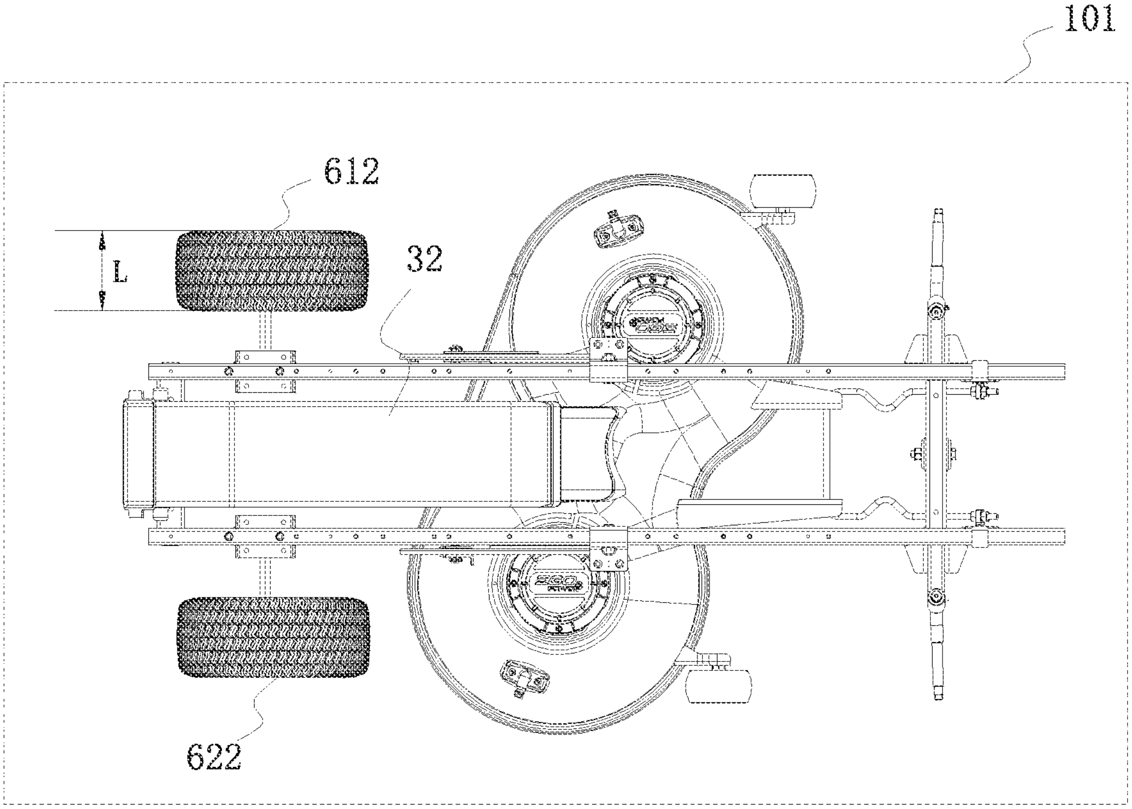
FIG. 34 is a top view of a three-dimensional structure in FIG. 33.
Figure 35:
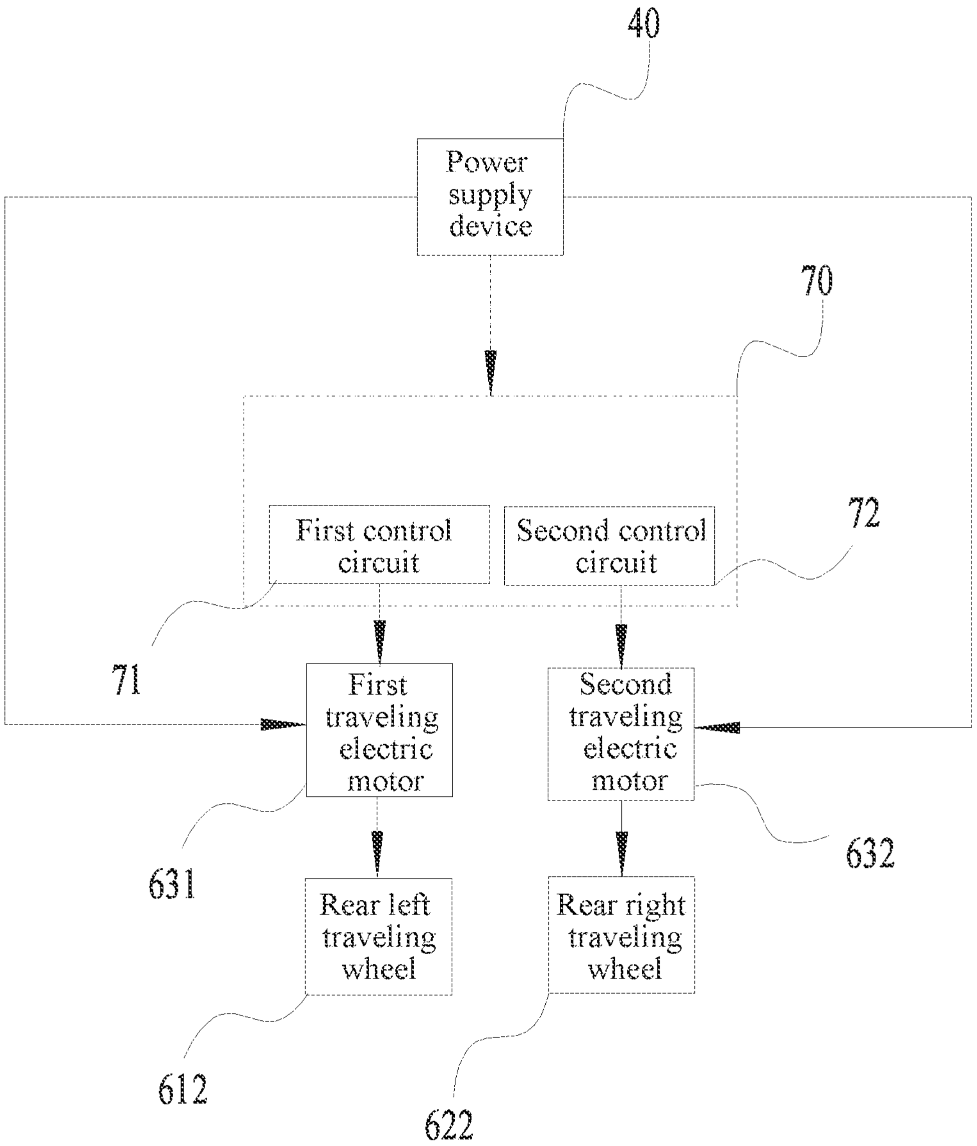
FIG. 35 is an electrical schematic diagram between a power supply device, control circuits, traveling electric motors, and traveling wheels according to an example of the present application.
Figure 36:
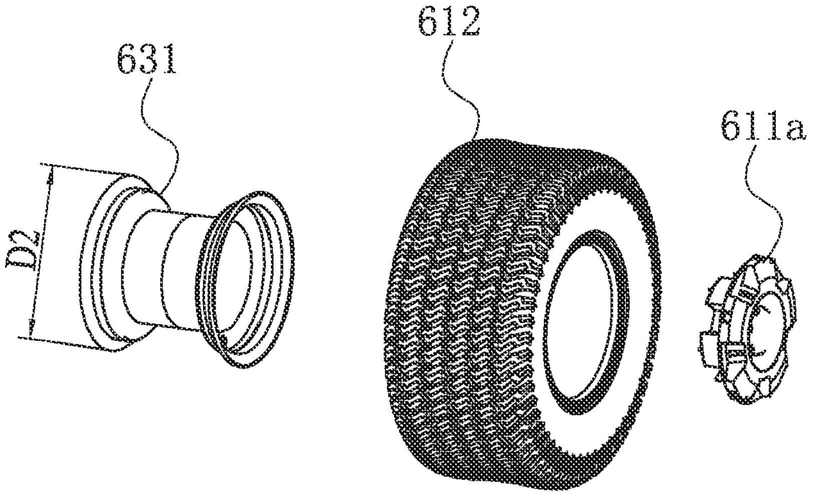
FIG. 36 is an exploded view of a traveling electric motor and a traveling wheel of a riding mower according to an example of the present application.

In some examples, as shown in FIG. 31, the mowing controller 832 includes a first mowing controller 8321 and a second mowing controller 8322. The mowing driver circuit 87 includes a first mowing driver circuit 871 and a second mowing driver circuit 872. The first mowing controller 8321 is electrically connected to the first mowing driver circuit 871 to control the state of the first mowing motor 131. The second mowing controller 8322 is electrically connected to the second mowing driver circuit 872 to control the state of the second mowing motor 132. Specifically, the first mowing controller 8321 is electrically connected to the first mowing driver circuit 871 to output a first mowing control signal to the first mowing driver circuit 871 to drive the first mowing element 121 to rotate. The second mowing controller 8322 is electrically connected to the second mowing driver circuit 872 to output a second mowing control signal to the second mowing driver circuit 872 to drive the second mowing element 122 to rotate. The first mowing control signal is different from the second mowing control signal.

As shown in FIGS. 32 to 36, the riding mower 100 includes the mowing assembly 10, the housing assembly 20, the grass collecting mechanism 30, the power supply device 40, the operating assembly 50, the traveling assembly 60, the frame 91, and the seat 92. The frame 91 extends basically along the front and rear direction. The frame 91 and the housing assembly 20 form the body of the riding mower 100. The body is at least used for mounting or supporting the mowing assembly 10, the seat 92, and the power supply device 40. The power supply device 40 is used for supplying energy to the mowing assembly 10, the traveling assembly 60, and the like so that the riding mower 100 can be used as a power tool. The electric riding mower 100 is more environmentally friendly and more energy-efficient than a fuel-based riding mower.

Specifically, the power supply device 40 is at least partially disposed on the front part of the riding mower 100. Specifically, the power supply device 40 is located at least partially in front of the seat 92 in the front and rear direction. The power supply device 40 includes the battery pack and the battery holder housing for mounting the battery pack. The battery pack is detachably mounted in the battery holder housing. One or multiple battery packs and battery holders may be provided. In some examples, the total energy of the power supply device 40 is greater than or equal to 0.5 kW·h and less than or equal to 6 kW·h. In some examples, the total energy of the power supply device 40 is greater than or equal to 1 kW·h and less than or equal to 5 kW·h. The total energy of the preceding power supply device may be understood as the sum of the energy of all battery packs. The traveling assembly 60 is used for supporting the frame 91 so that the riding mower 100 can travel on the ground. Specifically, the frame 91 includes longitudinal beams and cross beams. In some examples, the frame 91 includes the first longitudinal beam 911, the second longitudinal beam 912, the first cross beam 913, and the second cross beam 914. The first longitudinal beam 911 is disposed on the left side of the seat 92, and the second longitudinal beam 912 is disposed on the right side of the seat 92. The extension direction of the first longitudinal beam 911 is parallel to the extension direction of the second longitudinal beam 912. The first cross beam 913 is disposed on the front side of the seat 92. The first cross beam 913 is basically located at the front end of the riding mower 100, and the second cross beam 914 is basically located at the rear end of the riding mower 100. In this manner, the first cross beam 913 and the second cross beam 914 serve as bumpers to protect the front end and rear end of the riding mower 100 from being damaged. The traveling assembly 60 includes left traveling wheels and right traveling wheels. The left traveling wheels include the front left traveling wheel 611 and the rear left traveling wheel 612. The right traveling wheels include the front right traveling wheel 621 and the rear right traveling wheel 622.

The mowing assembly 10 is used for outputting power to implement the function of the riding mower 100. The mowing assembly 10 serves as a power output member. In some examples, the mowing assembly 10 includes the mowing elements (not shown in the figure), the deck 11 accommodating at least part of the mowing elements, and the mowing motors for driving the mowing elements to rotate. In some examples, the mowing assembly 10 is detachable from the riding mower 100. In this case, a work attachment interface of the riding mower 100 may be connected to another work attachment, such as a snow shoveling assembly. In this manner, the riding mower 100 is no longer just a riding mower and may also be a riding vehicle that can perform different tasks according to different connected work attachments. Different work attachment interfaces are used for matching different work attachments, and the same work attachment interface may match different work attachments.

The grass collecting mechanism 30 is used for collecting the grass clippings cut by the mowing assembly 10. The grass collecting mechanism 30 includes the accommodation device 31 for accommodating grass clippings and the grass collecting pipe 32 connected to the deck 11. The accommodation device 31 is detachable or movably mounted to the riding mower 100. The accommodation device 31 is used for collecting the grass clippings cut by the mowing assembly 10, and the grass collecting pipe 32 is used for guiding the grass clippings into the accommodation device 31. The grass collecting pipe 32 extends upward and backward from the transverse middle of the rear part of the deck 11 to form the grass outlet 321. The grass outlet 321 connects with the accommodation device 31 and is used for the grass cut by the mowing element to be transferred from the mowing assembly 10 to the accommodation device 31 through the grass collecting pipe 32 so that the grass accumulates in the accommodation device 31. The projection of the grass collecting pipe 32 on the first plane 101 supporting the traveling assembly 60 is at least partially located between the left traveling wheels and the right traveling wheels. Specifically, the grass collecting pipe 32 extends backward between the rear left traveling wheel 612 and the rear right traveling wheel 622.

The traveling assembly 60 further includes traveling electric motors for driving the traveling wheels to travel. Since the grass collecting mechanism 30 of the riding mower 100 in the present application is disposed substantially in the middle, the installation position of the traveling electric motor needs to be reasonably set. In some examples, the traveling electric motor is at least partially disposed inside the traveling wheel. In some examples, the projection of the rotor of the traveling electric motor on the first plane 101 is basically located within the projection of the traveling wheel on the first plane 101. Specifically, the traveling electric motors include a first traveling electric motor 631 and a second traveling electric motor 632. The first traveling electric motor 631 is used for driving the rear left traveling wheel 612, and the second traveling electric motor 632 is used for driving the rear right traveling wheel 622. The riding mower 100 further includes a control circuit 70 that is electrically connected to the power supply device 40 and used for controlling the operation of the first traveling electric motor 631 and the second traveling electric motor 632. In some examples, the control circuit 70 includes a first control circuit 71 electrically connected to the first traveling electric motor 631 and a second control circuit 72 electrically connected to the second traveling electric motor 632. In some examples, the first traveling electric motor 631 and the second traveling electric motor 632 may also be controlled by the same control circuit.

In some examples, the projection of the first traveling electric motor 631 or the second traveling electric motor 632 on the first plane 101 does not overlap the projection of the grass collecting pipe 32 on the first plane 101. In some examples, the first traveling electric motor 631 and the second traveling electric motor 632 are used for driving the rear left traveling wheel 612 and the rear right traveling wheel 622, respectively. Specifically, the first traveling electric motor 631 is built into the tire of the rear left traveling wheel 612 and is used for driving the rear left traveling wheel 612 to rotate about the rotation axis relative to the body so that the riding mower 100 moves relative to the ground. The first traveling electric motor 631 is mounted to the rear left traveling wheel 612 and then fixed through a fixing member 611*a*. The second traveling electric motor 632 is built into the tire of the rear right traveling wheel 622 and is used for driving the rear right traveling wheel 622 to rotate about the rotation axis relative to the body so that the riding mower 100 moves relative to the ground. The second traveling electric motor 632 is mounted to the rear right traveling wheel 622 and then fixed through a fixing member. In this example, the traveling electric motor for driving the traveling wheel to rotate is a wheel hub motor. The wheel hub motor may directly drive the traveling wheel to rotate or may be connected to a deceleration device to drive the traveling wheel to rotate. In some examples, the traveling electric motor may be a wheel motor at least partially disposed in the traveling wheel. The advantage of using the wheel hub motor or the wheel motor is that the electric motor is integrated into the traveling wheel so that a wider installation position can be reserved for the grass collecting pipe, and wider installation positions can be reserved for other components, such as a seat height adjustment assembly, the brake assemblies, and a cutting deck height adjustment assembly. On the other hand, the electric motor is disposed in the traveling wheel so that while the space is effectively saved, the electric motor can be protected from being hit by obstacles on the ground.

In some examples, the first traveling electric motor 631 and the second traveling electric motor 632 are used for driving the front left traveling wheel 611 and the front right traveling wheel 621, respectively. In some examples, four traveling electric motors may be provided and used for separately driving the four traveling wheels of the riding mower.

In some examples, the total rated power of the traveling electric motors is greater than or equal to 100 W and less than or equal to 1000 W, such as 300 W, 400 W, 500 W, 600 W, or 1000 W. In some examples, the rotational speed of the wheel hub motor is less than or equal to 400 RPM. In some examples, the rotational speed of the wheel hub motor is greater than or equal to 30 RPM and less than or equal to 120 RPM. In some examples, the rotational speed of the wheel hub motor is greater than or equal to 50 RPM and less than or equal to 100 RPM. In some examples, the torque of the wheel hub motor is less than or equal to 35 N·m. Optionally, the torque of the wheel hub motor is greater than or equal to 10 N·m and less than or equal to 25 N·m.

In some examples, the diameter D1 of the rear left traveling wheel 612 is greater than or equal to 16 inches and less than or equal to 22 inches. For example, the diameter D1 of the rear left traveling wheel 612 may be 20 inches. In some examples, the tire width L of the rear left traveling wheel 612 is greater than or equal to 6 inches and less than or equal to 10 inches. For example, the tire width L of the rear left traveling wheel 612 may be 7 inches or 8 inches. In some examples, the hub diameter D2 of the rear left traveling wheel 612 is greater than or equal to 6 inches and less than or equal to 10 inches. For example, the hub diameter D2 of the rear left traveling wheel 612 may be 8 inches. In an example, the traveling speed of the rear left traveling wheel 612 is less than or equal to 2 m/s. Optionally, the traveling speed of the rear left traveling wheel 612 is greater than or equal to 0.4 m/s and less than or equal to 1.4 m/s, such as 0.4 m/s, 0.7 m/s, 0.9 m/s, 1.3 m/s, or 1.4 m/s. It is to be noted that the specific parameters of the rear right traveling wheel 622 are configured to be the same as those of the rear left traveling wheel 612.

What is claimed is:

1. A riding mower, comprising:

a mowing assembly comprising a mowing element and a deck accommodating at least part of the mowing element;

a traveling assembly comprising left traveling wheels and right traveling wheels, wherein the left traveling wheels comprise a left front wheel and a left rear wheel, and the right traveling wheels comprise a right front wheel and a right rear wheel;

a single traveling electric motor for driving the left rear wheel and the right rear wheel through a transmission device;

a grass collecting pipe connected to the deck to guide grass clippings; and a power supply device configured to supply power to the traveling electric motor;

wherein a projection of the grass collecting pipe on a traveling plane supporting the left traveling wheels and the right traveling wheels is at least partially located between the left traveling wheels and the right traveling wheels, wherein a maximum total energy of the power supply device is greater than or equal to 0.5 kW·h and less than or equal to 6 kW·h, and wherein a projection of the single traveling electric motor on a traveling plane on which the riding mower travels, at least partially overlaps the projection of the grass collecting pipe on the traveling plane.

2. The riding mower of claim 1, wherein the power supply device is at least partially located in front of front traveling wheels in a front and rear direction.

3. The riding mower of claim 2, wherein the front traveling wheels are connected through a front axle and, in the front and rear direction, a distance L1 between a front side of the power supply device and the front axle is greater than or equal to 0 and less than or equal to 500 mm.

4. The riding mower of claim 1, wherein a ratio of a width W1 of the power supply device in a left and right direction to a width W2 of the riding mower in the left and right direction is greater than or equal to 0.2 and less than or equal to 1.5.

5. The riding mower of claim 1, wherein the power supply device comprises at least one battery pack pluggably connected to the riding mower to supply power to at least the traveling electric motor.

6. The riding mower of claim 5, wherein the at least one battery pack is adaptable to another electrical device, and the electrical device comprises a lighting device or a handheld power tool.

7. The riding mower of claim 1, further comprising a frame and a back plate assembly, wherein the mowing assembly and the traveling assembly are mounted to the frame, the back plate assembly comprises a fixing bracket and a back plate mounted on the fixing brackets, and the fixing bracket is mounted to the frame.

8. The riding mower of claim 7, wherein the grass collecting pipe comprises a first end connected to the deck and a second end opposite to the first end, and the second end is rotatably connected to the back plate.

9. The riding mower of claim 7, further comprising a full grass detection device for detecting a state of the grass clippings in an accommodation device, wherein the full grass detection device is mounted to the back plate and comprises a non-contact switch.

10. The riding mower of claim 7, wherein the mowing assembly further comprises a first mowing motor for driving a first mowing element and a second mowing motor for driving a second mowing element, and a direction of rotation of the first mowing motor is opposite to a direction of rotation of the second mowing motor.

11. The riding mower of claim 1, further comprising a brake mechanism, wherein the brake mechanism comprises a first brake assembly for braking a front left traveling wheel and a second brake assembly for braking a front right traveling wheel, the brake mechanism further comprises a first connection assembly connecting the first brake assembly to the second brake assembly, and the first connection assembly comprises a first connector located on an upper side or a lower side of the grass collecting pipe.

12. The riding mower of claim 1, further comprising a height adjustment member, wherein the height adjustment member comprises a first height adjustment assembly, a second height adjustment assembly, and a second connection assembly for connecting the first height adjustment assembly to the second height adjustment assembly, the first height adjustment assembly and the second height adjustment assembly are connected to the deck, and at least part of the second connection assembly is located above the grass collecting pipe.

13. The riding mower of claim 1, further comprising a seat supported by a first support member and a second support member, wherein a connector is disposed between the first support member and the second support member, and at least part of the connector is located above the grass collecting pipe.

14. The riding mower of claim 1, wherein the power supply device comprises a first battery pack and a second battery pack, and a maximum energy of the first battery pack or the second battery pack is greater than or equal to 0.1 kW·h and less than or equal to 4 kW·h.

15. The riding mower of claim 1, wherein the grass collecting mechanism comprises a back plate assembly, and the single traveling electric motor is not lower than the back plate assembly in the up and down direction.

16. A riding mower, comprising:

a mowing assembly comprising a mowing element and a deck accommodating at least part of the mowing element;

a traveling assembly configured to drive the riding mower to travel on the ground;

a traveling electric motor configured to drive the traveling assembly;

a power supply device configured to supply power to the traveling electric motor; and a grass collecting pipe connected to the deck to guide grass clippings;

wherein a projection of the traveling electric motor on a traveling plane on which the riding mower travels and which supports the traveling assembly at least partially overlaps a projection of the grass collecting pipe on the traveling plane.

17. The riding mower of claim 16, wherein the traveling electric motor is located below the grass collecting pipe in an up and down direction.

18. The riding mower of claim 16, wherein the traveling assembly comprises a rear left traveling wheel and a rear right traveling wheel, the rear left traveling wheel and the rear right traveling wheel are connected through a rear axle, and the traveling electric motor is located behind the rear axle in a front and rear direction.

19. A riding mower, comprising:

a mowing assembly comprising a mowing element and a deck accommodating at least part of the mowing element;

a traveling assembly comprising traveling wheels and traveling electric motors driving the traveling wheels to rotate on a traveling plane, wherein the traveling wheels comprise left traveling wheels and right traveling wheels;

a grass collecting pipe connected to the deck to guide grass clippings; and a power supply device configured to supply power to the traveling electric motors;

wherein a projection of the grass collecting pipe on the traveling plane supporting the traveling assembly is at least partially located between the left traveling wheels and the right traveling wheels; and a projection of at least one of the traveling electric motors on the traveling plane supporting the traveling assembly at least partially overlaps a projection of the grass collecting pipe on the traveling plane.

20. The riding mower of claim 19, wherein a projection of a rotor of one of the traveling electric motors on the traveling plane is basically located within a projection of one of the traveling wheels on the traveling plane.

* * * * *